US012519792B2

(12) United States Patent
Suson et al.

(10) Patent No.: US 12,519,792 B2
(45) Date of Patent: Jan. 6, 2026

(54) INTERNET ACCESS FILTERING SYSTEMS AND METHODS

(71) Applicant: Circle Media Labs Inc., Portland, OR (US)

(72) Inventors: Marco Angelo Suson, Valencia, CA (US); Michael Benjamin Higgins, Newberg, OR (US); Nathan Victor Bak, Portland, OR (US)

(73) Assignee: Circle Media Labs Inc., Portland, OR (US)

( * ) Notice: Subject to any disclaimer, the term of this patent is extended or adjusted under 35 U.S.C. 154(b) by 883 days.

(21) Appl. No.: 17/691,574

(22) Filed: Mar. 10, 2022

(65) Prior Publication Data

US 2022/0294790 A1    Sep. 15, 2022

Related U.S. Application Data

(60) Provisional application No. 63/161,308, filed on Mar. 15, 2021.

(51) Int. Cl.
    *H04L 9/40*    (2022.01)
(52) U.S. Cl.
    CPC ............ *H04L 63/101* (2013.01); *H04L 63/20* (2013.01)
(58) Field of Classification Search
    None
    See application file for complete search history.

(56) References Cited

U.S. PATENT DOCUMENTS 8,990,223 B2    3/2015    Melnychenko et al.
9,742,734 B2    8/2017    Wood
(Continued)

FOREIGN PATENT DOCUMENTS

AU    2019101282 A4    12/2019
CN    112242981 A    1/2021
(Continued)

OTHER PUBLICATIONS

Medvedev, M., Sep. 2023. Research of Approaches to the Effectiveness of Updating Black and White Lists. In International Workshop on Advanced Information Security Management and Applications (pp. 196-202). Cham: Springer Nature Switzerland. (Year: 2023).*

(Continued)

*Primary Examiner* — Luu T Pham
*Assistant Examiner* — Edward X Long
(74) *Attorney, Agent, or Firm* — Smith Tempel; Lei Fang; Steven P. Wigmore

(57) ABSTRACT

Methods of filtering comprise aggregating a plurality of filter rulesets to produce an active aggregated filter ruleset ($F_A$) having $F_A$ lists of allowed and blocked platforms, and processing a platform access request through the $F_A$. The processing includes blocking the request if the requested platform is in the $F_A$ list of blocked platforms and allowing the request if the requested platform is in the $F_A$ list of allowed platforms. Methods of aggregating filter rulesets include combining a lowest priority filter ruleset ($F_1$) with a second lowest priority filter ruleset ($F_2$), which includes removing any platforms of an $F_1$ list of blocked platforms from an $F_1$ list of allowed platforms, adding an $F_2$ list of allowed platforms to the $F_1$ list of allowed platforms, removing any platforms of the $F_2$ list of allowed platforms from the $F_1$ list of blocked platforms, and adding the $F_1$ and $F_2$ lists of blocked platforms.

13 Claims, 5 Drawing Sheets

(56) References Cited

U.S. PATENT DOCUMENTS

| | | | |
|---|---|---|---|
| 9,992,166 | B2 | 6/2018 | Ji et al. |
| 10,958,674 | B2 | 3/2021 | Tsironis |
| 11,030,341 | B2 | 6/2021 | LaFever et al. |
| 11,165,750 | B1 | 11/2021 | H R et al. |
| 2018/0278678 | A1* | 9/2018 | Weng ................. H04L 63/0236 |
| 2020/0162890 | A1 | 5/2020 | Spencer et al. |
| 2020/0401711 | A1 | 12/2020 | Hayes et al. |
| 2020/0404010 | A1* | 12/2020 | Costante ............... H04L 63/145 |
| 2021/0142329 | A1* | 5/2021 | Aparício ................ G06N 5/025 |

FOREIGN PATENT DOCUMENTS

| | | |
|---|---|---|
| IN | 1349MUMNP2013 A | 1/2014 |
| WO | WO2012092487 A1 | 7/2012 |
| WO | WO2013079115 A1 | 6/2013 |
| WO | WO2015076904 A2 | 5/2015 |

OTHER PUBLICATIONS

Burton, R. and Rocha, L., Nov. 2019. Whitelists that work: Creating defensible dynamic whitelists with statistical learning. In 2019 APWG Symposium on Electronic Crime Research (eCrime) (pp. 1-10). IEEE. (Year: 2019).*

English-language machine translation of Chinese Patent Application Publication No. CN112242981A, Jan. 19, 2021.

Turner, Brett Ronald. "An Investigation into the Efficacy of URL Content Filtering Systems," Edith Cowan University. Publication Date: 2021.

FortiGuard Labs Web Filter: https://www.fortiguard.com/learnmore#wf. Date Accessed: Jan. 4, 2022.

Bark: https://www.bark.us/how/. Date Accessed: Jan. 4, 2022.

Net Nanny Internet Filter: https://www.netnanny.com/features/internet-filter/. Date Accessed: Jan. 4, 2022.

CurrentWare BrowseControl URL Filtering Software: https://www.currentware.com/products/browsecontrol/url-filter/. Date Accessed: Jan. 4, 2022.

* cited by examiner

INTERNET ACCESS FILTERING SYSTEMS AND METHODS

RELATED APPLICATION

This application claims priority to similarly titled U.S. Provisional Patent Application No. 63/161,308, which was filed on Mar. 15, 2021, and the complete disclosure of which is hereby incorporated by reference.

FIELD OF DISCLOSURE

The present disclosure relates to selective filtering of internet access.

BACKGROUND OF DISCLOSURE

As internet use by individuals and families increases, there is an increasing desire to be able to selectively filter internet usage at different times during the day. This can be as simple as disabling all Internet for a household at bedtime, but gets more complicated in scenarios such as allowing a child to access educational resources needed for online school while simultaneously blocking access to distracting websites such as social media or online gaming.

One solution is to create an "allow list" of internet domains or IP addresses and block all traffic that does not match an item on the list. A more permissive approach is to create a "block list" and block any traffic matching an item on the list while allowing everything else. Both approaches are simple to implement, but unfortunately are not able to scale for most practical purposes.

One difficulty is that a single platform may have multiple domains or IP addresses. For example, if a person wanted to create a list to allow or block use of the popular video sharing platform YouTube™, the list would need to contain several domains including youtube.com, youtu.be, youtube.co, and googlevideo.com in order to be effective.

Another factor is that there are many different platforms available on the Internet and more are added all the time. Determining exactly what should be allowed can be a cumbersome task; during the course of a typical day of school-related or work-related internet usage, dozens of different platforms may be accessed, and it is not possible to predict what new platforms a teacher or employer may start using. Further, because new domains are constantly added, it means explicitly blocking all but a small subset of sites and services is not possible.

Additionally, there are situations, particularly for non-website platforms such as for online gaming, where ranges of ports and/or IP addresses may need to be allowed or blocked in order to be effective. This means a simple allow or block list will not work in such cases.

SUMMARY

Computer implemented methods of filtering internet access requests and computer implemented methods of aggregating filter rulesets are disclosed herein. The methods of filtering comprise receiving a platform access request to access a requested platform and aggregating a plurality of filter rulesets in a hierarchical, priority-ordered combination to produce an active aggregated filter ruleset ($F_A$), in which each filter ruleset ($F_n$) is assigned a respective priority and includes a respective $F_n$ list of allowed platforms and a respective $F_n$ list of blocked platforms, and the active aggregated filter ruleset includes an $F_A$ list of allowed platforms and an $F_A$ list of blocked platforms that are created by the hierarchical, priority-ordered combination of the $F_n$ lists of allowed platforms and the $F_n$ lists of blocked platforms of the filter rulesets. The methods of filtering further include processing the platform access request through the active aggregated filter ruleset. The processing includes determining if the requested platform is in the $F_A$ list of blocked platforms and blocking the platform access request if the requested platform is in the $F_A$ list of blocked platforms. The processing also includes determining if the requested platform is in the $F_A$ list of allowed platforms and allowing the platform access request if the requested platform is in the $F_A$ list of allowed platforms.

The methods of aggregating include combining a first lowest priority filter ruleset ($F_1$) with a second lowest priority filter ruleset ($F_2$) of a plurality of filter rulesets having N filter rulesets to produce an aggregated filter ruleset having an $F_c$ list of allowed platforms and an $F_c$ list of blocked platforms. The combining includes removing any blocked platforms of the $F_1$ list of blocked platforms from the $F_1$ list of allowed platforms and adding all allowed platforms of the $F_2$ list of allowed platforms to the $F_1$ list of allowed platforms to create the $F_c$ list of allowed platforms. The combining also includes removing any allowed platforms of the $F_2$ list of allowed platforms from the $F_1$ list of blocked platforms and adding the $F_2$ list of blocked platforms to the $F_1$ list of blocked platforms to create the $F_c$ list of blocked platforms. The methods of aggregating further include repeating the combining N−2 times to produce the active aggregated filter ruleset, where the aggregated filter ruleset produced in each combining step is treated as the first lowest priority filter ruleset in a subsequent combining with a next lowest priority filter ruleset if the plurality of filter rulesets comprises the next lowest priority filter ruleset.

DETAILED DESCRIPTION

Figure 1:
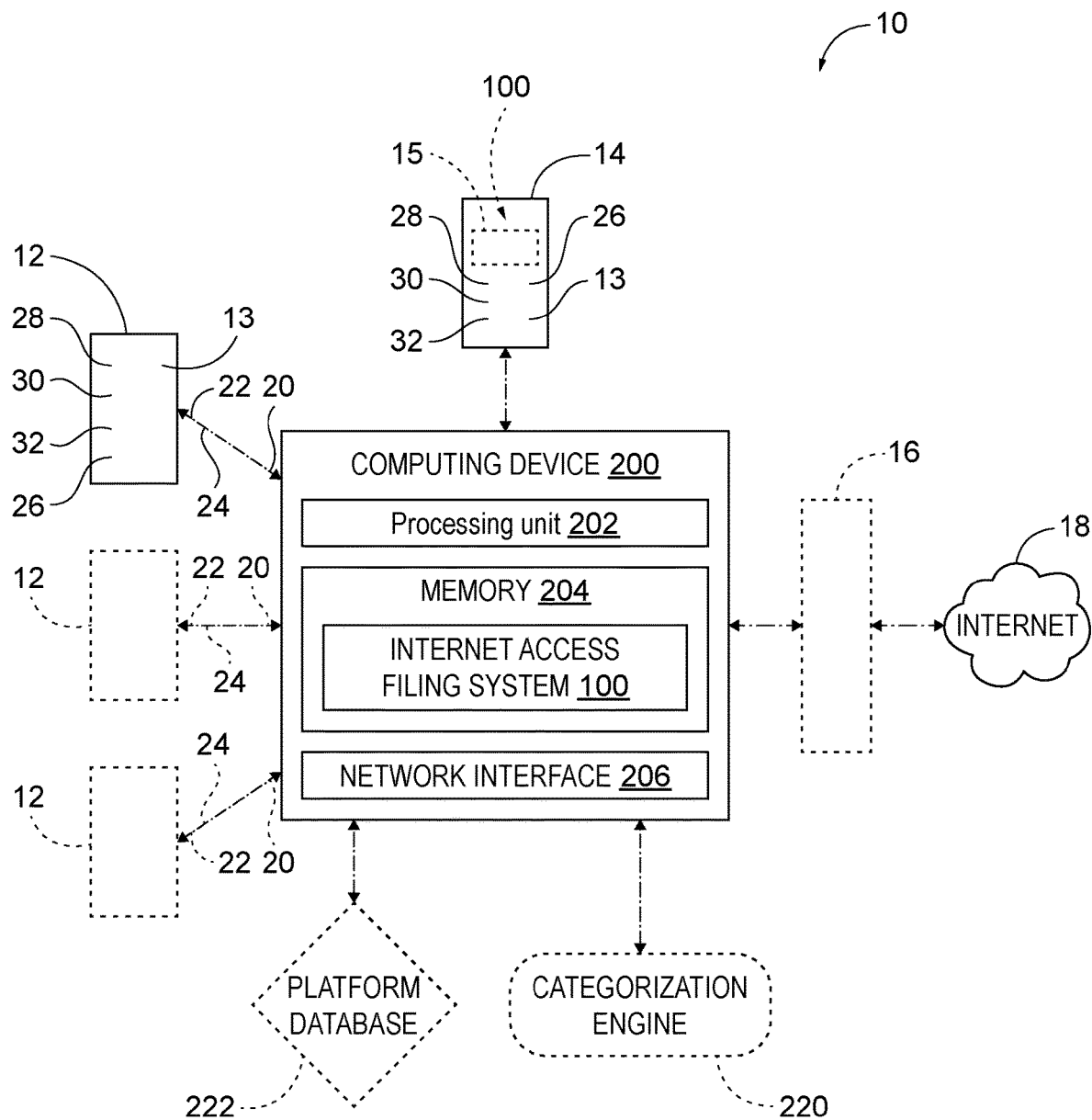
FIG. 1 is a schematic representation of examples of computing networks comprising access control computing devices according to the present disclosure.

FIGS. 1-5 provide illustrative, non-exclusive examples of methods 500 of filtering internet access requests, methods 600 of aggregating filter rulesets, internet access filtering systems 100, access control computing devices 200 comprising internet access filtering systems 100, and computing networks 10 comprising access control computing devices according to the present disclosure. In general, in the drawings, elements that are likely to be included in a given example are illustrated in solid lines, while elements that are optional or alternatives are illustrated in dashed lines. However, elements that are illustrated in solid lines are not essential to all examples of the present disclosure, and an element shown in solid lines may be omitted from a particular example without departing from the scope of the present disclosure. Dot-dash lines are utilized to indicate communication relationships, and these relationships may or may not be optional to the illustrated embodiment. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used herein for consistency. Elements, components, and/or features that are discussed with reference to one or more of the figures may be included in and/or utilized with any of the figures without departing from the scope of the present disclosure.

FIG. 1 is a schematic representation of examples of access control computing devices 200 and computing networks 10 comprising the access control computing devices. Computing network 10 includes one or more user devices 12 and one or more administrative devices 14 that are communicably coupled to access control computing device 200. Examples of suitable user devices 12 and/or administrative devices 14 include personal computers, laptop computers, handheld devices, tablets, cell phones, smartphones, gaming systems, smart TVs, and/or any other user-controlled computing devices that are configured to interface directly or indirectly with the Internet 18. User devices 12 and administrative devices 14 according to the present disclosure each typically include at least a display device 26, a user input device 13, at least one processor 28, a storage device 30, and a communication device 32 for sending and receiving data. As used herein, a user device 12 may refer to an individual device or a user profile and/or account on an individual device. Accordingly, an individual device may include one or more user devices 12 as referred to herein, with each user device 12 corresponding to a unique profile or account.

Access control computing device 200, administrative device(s) 14, and user device(s) 12 may form a local network, such as, for example, a home computing network. Computing network 10 also may include a network device 16 that is in communication with access control computing device 200, administrative device(s) 14, user device(s) 12, and the Internet 18. Network device 16 is configured to direct communication between the Internet 18 and access control computing device 200, administrative device(s) 14, and user device(s) 12. In other words, network device 16 may direct internet traffic to and from the local network such that administrative device(s) 14 and user device(s) 12 may be connected to the Internet 18 through network device 16. For example, network device 16 may include a router and/or a gateway router. As referred herein, the Internet 18 is given its ordinary meaning of the global system of interconnected computer networks.

The components of computing network 10, including user device(s) 12, network device 16, administrative device(s) 14, and access control computing device 200, may be communicably coupled with one another using various network technologies. Such network technologies may include one or more wireless connections. More specific examples of network technologies for communicably coupling the components of computing network 10 include Wireless Local Area Network (WLAN), Bluetooth™, Worldwide Interoperability for Microwave Access (WiMAX), Wi-Fi, Ethernet communication networks, and powerline communication networks.

Access control computing device 200 typically includes a processing unit 202, a memory device 204, and a network interface 206 for communicating with the other components of computing network 10, for example administrative device(s) 14, user device(s) 12, and/or network device 16, and/or for communicating with the Internet 18. Processing unit 202 is communicatively coupled to memory device 204 and may include one or more processors. Processing unit 202 is configured to execute instructions, applications, software, or programs stored in memory device 204. In some examples, the one or more processors of processing unit 202 include, without limitation, a hardware central processing unit (CPU), a graphics processing unit (GPU), a field-programmable gate array (FPGA), a complex programmable logic device (CPLD), an application-specific integrated circuit (ASIC), a system-on-chip (SoC), or a combination thereof.

Access control computing device 200 also includes internet access filtering system 100 stored on memory device 204. Internet access filtering system 100 may include computer-readable instructions or software that are executable on processing unit 202 to cause access control computing device 200 to perform various functions that are discussed in more detail herein. Additionally or alternatively, memory device 204 may include computer-readable instructions that, when executed by processing unit 202, cause access control computing device 200 to perform methods according to the present disclosure. Examples of methods according to the present disclosure are illustrated and discussed in more detail herein with reference to FIGS. 4 and 5. Memory device 204 additionally or alternatively may be referred to herein as a storage, a storage device, and/or a memory. Memory devices 204 according to the present disclosure may take any suitable form for receiving and storing software, or computer-executable instructions.

Memory device 204 is an example of computer-readable media. In some examples, computer-readable media include two types of computer-readable media, namely computer storage media and communication media. In some examples, computer storage media includes volatile and non-volatile media and/or removable and non-removable media implemented in any method or technology for storage of information, such as computer-readable instructions, data structures, program components, or other data. Computer storage media includes, but is not limited to, random access memory (RAM), read-only memory (ROM), erasable programmable read-only memory (EPROM), electrically erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, including access control computing device 200 and optionally other computing devices of computing network 10.

In contrast, communication media embody computer-readable instructions, data structures, program components, or other data in a modulated data signal, such as a carrier wave, or other transmission mechanism. As defined herein, computer storage media does not include communication media.

Network interface 206 includes physical and/or logical interfaces for connecting access control computing device 200 to another computing device and/or a network. In some examples, network interface 206 enables Wi-Fi-based communication such as via frequencies defined by IEEE 802.11 standards, short range wireless frequencies (e.g., Bluetooth™), or any suitable wired or wireless communication protocol that enables access control computing device 200 to interface with the other computing devices or networks, as discussed herein.

With continued reference to FIG. 1, access control computing device 200 is configured to manage traffic between user device(s) 12 and the Internet 18. For examples in which computing network 10 comprises network device 16, access control computing device 200 may be configured to manage internet traffic through network device 16 and user device(s) 12. In some examples, access control computing device 200 intervenes or intermediates at least some communications between user device(s) 12 and network device 16, such that user device(s) 12 communicate through access control computing device 200 to network device 16, at least for some communications. More specifically, access control computing device 200 is configured to filter access of user device(s) 12 to the Internet 18, such as based on logic, protocol, and/or rules established by internet access filtering system 100 and/or by executing methods according to the present disclosure. As referred to herein, access control computing device 200 "filtering" internet access attempts by user device(s) 12 includes access control computing device 200 allowing or blocking specific internet access attempts as governed by internet access filtering system 100 and/or methods according to the present disclosure.

In particular, access control computing device 200 is configured to receive platform access requests 20 from user device 12. Platform access request 20 corresponds to user device 12 attempting to access the Internet 18 via a specific, or requested, platform. Access control computing device 200 is configured and to block 22 or allow 24 the platform access request 20 based on an identity and/or a category of the requested platform. Platform access request 20 additionally or alternatively may be referred to herein as internet access request 20.

As discussed in more detail, internet access filtering system 100 may include a plurality of filter rulesets assigned to each user device 12. Each filter ruleset includes one or more of a list of allowed platforms, a list of blocked platforms, optionally a list of allowed platform categories, and optionally a list of blocked platform categories. Internet access filtering system 100 is configured to aggregate the plurality of filter rulesets respective to a given user device 12 in a hierarchical, priority-ordered combination to produce an active aggregated filter ruleset. This hierarchical, priority-ordered combination additionally or alternatively may be referred to as a hierarchical priority-ordered summation. The active aggregated filter ruleset includes a corresponding list of allowed platforms, a corresponding list of blocked platforms, and optionally corresponding lists of allowed and blocked platform categories that are created by aggregation of the plurality of filter rulesets, as discussed in more detail herein. Access control computing device 200 is configured to utilize the active aggregated filter ruleset list to determine whether to allow 24 or block 22 platform access request 20.

More specifically, access control computing device 200 is configured to determine whether the requested platform is in the active aggregated filter ruleset list of blocked platforms and block 22 platform access request 20 if the requested platform is in the active aggregated filter ruleset list of blocked platforms. If the requested platform is not in the active aggregated filter ruleset list of blocked platforms, access control computing device 200 is configured to determine whether the requested platform is in the active aggregated filter ruleset list of allowed platforms and allow 24 platform access request 20 if the requested platform is in the active aggregated filter ruleset list of blocked platforms. If the requested platform is not in the active aggregated filter ruleset list of allowed platforms, access control computing device 200 may be configured to determine whether the platform category of the requested platform is in the active aggregated filter ruleset list of blocked platform categories and block the platform access request if the platform category of the requested platform is in the active aggregated filter ruleset list of blocked platform categories. If the platform category of the requested platform is not in the active aggregated filter ruleset of blocked platform categories, access control computing device 200 may be configured to determine whether the platform category of the requested platform is in the active aggregated filter ruleset list of allowed platform categories, and allow 24 the platform access request when the platform category of the platform access request is in the active aggregated list of allowed platform categories. If the platform category is not in the active aggregated list of allowed platform categories, access control computing device 200 may be configured to block 22 the platform access request. That is, access control computing device 200 may be default to blocking a platform access request when the requested platform and the platform category thereof are not included in the active aggregated filter ruleset.

When access control computing device 200 blocks 22 the platform access request 20, the user device that issued platform access request 20 is prevented from accessing the Internet 18 via or utilizing the requested platform. For example, access control computing device 200 may block 22 a platform access request 20 by preventing the platform access request 20 from being transmitted to network device 16. When access control computing device 200 allows 24 platform access request 20, the user device that issued the platform access request 20 is allowed, or permitted, to access the Internet 18 via or utilizing the requested platform, for example, by being permitted to transmit the platform access request 20 to network device 16.

As defined herein, a platform refers to a specific or unique digital destination that can be accessed by or operated on a user device and that requires interne access for or during operation. Generalized examples of platforms include an application software that accesses the Internet, a website, a web page, a web application, an online application, a web domain, a web service, and/or a web browser. More specific examples of websites include Wikipedia.org, youtube.com, facebook.com, netflix.com, cnn.com, reddit.com, etc. Illustrative examples of application software include Snapchat™, Instagram™, TikTok™, WhatsApp™, Zoom™, Spotify™, etc. Platforms may be categorized under a platform category based on the content that is accessed through the platforms, with platforms of a common category providing access to related content. Any given platform category typically covers a plurality of platforms. Any given platform category also may cover any combination or selection of web pages, web applications, application software, online applications, web domains, web services, and/or web browsers. Illustrative, non-exclusive examples of platform categories include a browsing platform category, an adult platform category, a search platform category, a video sharing platform category, a video streaming platform category, an entertainment platform category, a gaming platform category, a social media platform category, a comedy platform category, a communication platform category, a blog platform category, a content sharing platform category, a discussion platform category, an audio media platform category, a video calling platform category, a messaging platform category, an email platform category, an informational platform category, a business platform category, a sports platform category, an educational platform category, a news platform category, and a computational knowledge platform category.

Platform access request 20 may include information that access control computing device 200 utilizes to determine the identity of the requested platform and/or the category of the requested platform. For example, platform access request 20 may include information directly indicating the identity and/or category of the requested platform. Additionally or alternatively, access control computing device 200 may operate to determine the identity and/or category of the requested platform. As more specific examples, platform access request 20 may include information such as a domain name or an IP address, as well as protocol and port information relating to the requested platform.

As shown in FIG. 1, access control computing device 200 may include or be in communication with a platform database 222. Platform database 222 includes a collection of platforms, or platform identities, and access control computing device 200 may be configured to query platform database 222 with the information provided in platform access request 20 to determine the identity of the requested platform of platform access request 20. In other words, access control computing device 200 may be configured to send platform database 222 information relating to platform access request 20 and receive the identity of the corresponding requested platform from platform database 222. Additionally or alternatively, access control computing device 200 may be configured to access platform database 222 to determine the identity of the requested platform. In this way, user device 12 may need only to specify the requested platform instead of all domains, IP addresses, etc. required to access the platform. In some examples, platform database 222 also is configured to provide the platform category of the requested platform.

In some examples, access control computing device 200 includes or is in communication with a categorization engine 220. In such examples, access control computing device 200 is configured to query categorization engine 220 for the platform category of the requested platform of a given platform access request 20. For example, access control computing device 200 may be configured to provide categorization engine 220 with information relating to a platform access request 20 and/or the requested platform of the platform access request 20, and categorization engine 220 in turn utilizes this information to determine and return the platform category of the requested platform to access control computing device 200. Access control computing device 200 may be in direct communication with categorization engine 220 and/or platform database 222. Additionally or alternatively, access control computing device 200 may be configured to communicate with categorization engine 220 and/or platform database 222 via network device 16 and/or the Internet 18. For example, categorization engine 220 and/or platform database 222 may be stored on at least one respective remote server. Utilizing categorization engine 220 may allow internet access filtering system 100 to adapt as new platforms become available.

With continued reference to FIG. 1, computing network 10 may include any suitable number of user devices 12, such as at least one, at least two, at least three, at least four, at least five, at least ten, at least 20, at least 30, and/or at most 30 user devices 12. Access control computing device 200 may be configured to filter platform access requests 20 within any suitable type of computing network 10, for example a home computer network, a school computer network, a classroom computer network, a work computer network, and/or a conference computer network.

In the examples of FIG. 1, computing network 10 comprises at least one administrative device 14 that is configured to manage operation of access control computing device 200 and/or of internet access filtering system 100. More specifically, administrative device 14 includes user input device 13 through which an administrative user may control aspects of access control computing device 200 and/or of internet access filtering system 100. Examples of an administrative user include a parent, a teacher, and/or a manager, while examples of a user, whom operates user device 12, include a child, a student, and/or an employee. User input devices 13 according to the present disclosure may include input structures of any suitable form, including, but not limited to, a touch screen, a keyboard, a number pad, a button, a plurality of buttons, etc. Internet access filtering system 100 also may include application software having a graphical user interface 15 installed on administrative device 14 and through which the administrative user is able to issue commands to access control computing device 200 and/or internet access filtering system 100. For example, and as discussed in more detail herein, an administrative user may manage a priority, grouping, and/or schedule assigned to a given set of filter rulesets to control or manage the filtering of internet access to a given user device 12 as needed. By contrast, user device(s) 12 may not include graphical user interface 15 and/or may be given limited or no authority to control internet access filtering system 100 and/or access control computing device 200.

While FIG. 1 illustrates some examples in which user devices 12 are discrete from access control computing device 200 and/or in which internet access filtering system 100 is installed or stored separately from user device(s) 12, in some examples, internet access filtering system 100 may be installed on any or each user device 12, and/or access control computing device 200 may be regarded as being included in, defining a portion of, and/or as being in a wired connection with user device 12. In such examples, internet access filtering system 100 and/or access control computing device 200 operates in a similar, or at least substantially similar, manner to that discussed herein with respect to examples in which user device(s) 12 are discrete from access control computing device 200 and/or internet access filtering system 100. In such examples, administrative device 14 may be configured to control access control computing device 200 and/or internet access filtering system 100 by communicating with a given user device 12, such as discussed herein. Further in such examples, internet access filtering system 100 may be utilized to filter platform access requests 20 made by user device 12 when user device 12 is connected directly to the Internet 18 and/or connected to the Internet 18 outside of computing network 10.

Figure 2:
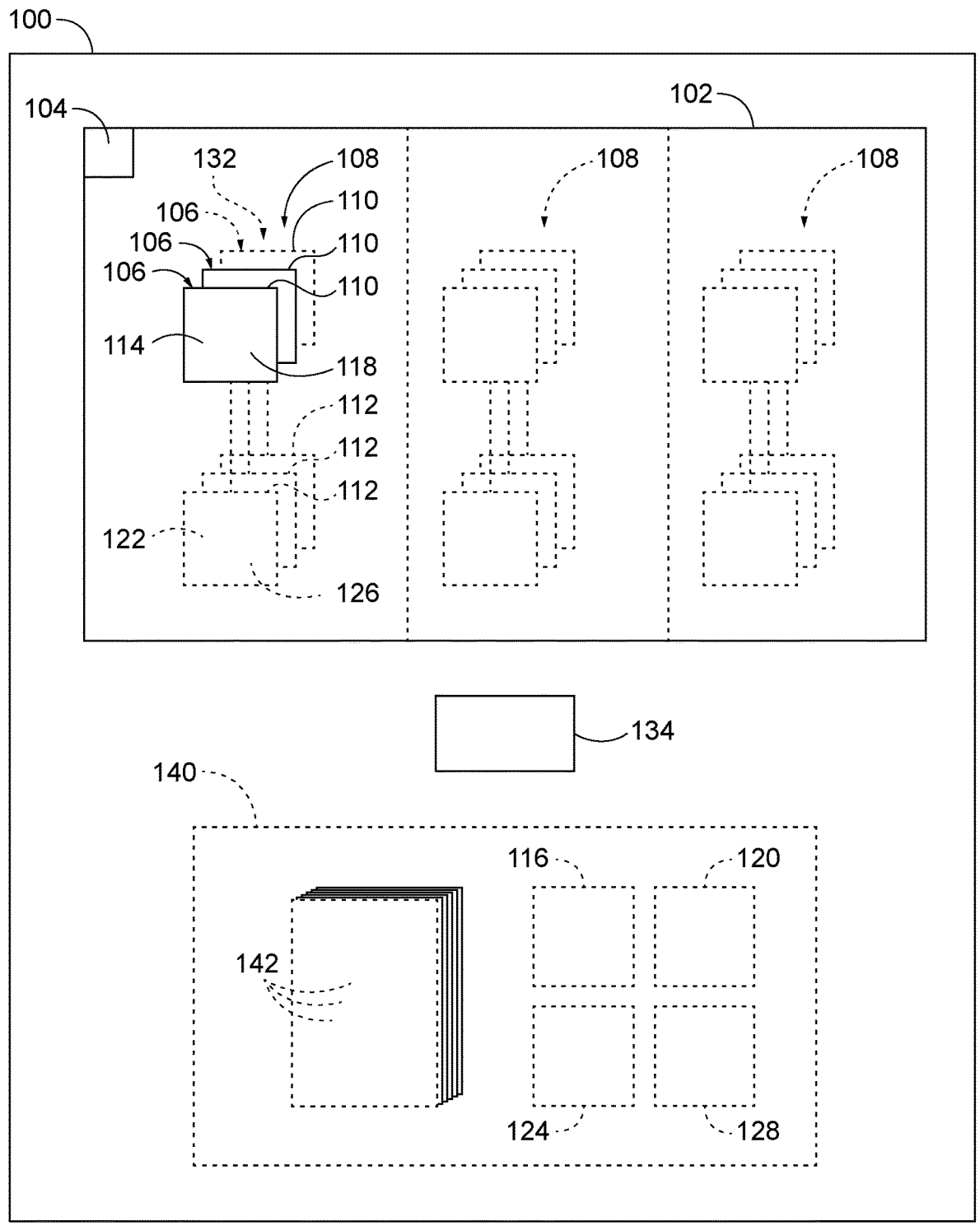
FIG. 2 is a schematic representation of examples of internet access filtering systems according to the present disclosure.

FIG. 2 schematically represents examples of internet access filtering systems 100 according to the present disclosure. Internet access filtering systems 100 illustrated and discussed herein with reference to FIG. 2 may be included in and/or utilized with access control computing devices 200 and/or the various components of computing network 10 that are illustrated and discussed herein with reference to FIG. 1. Likewise, any of the components, aspects, features, functions, etc., of computing networks 10 illustrated and discussed herein with reference to FIG. 1 may be utilized in conjunction with the examples of FIG. 2. As shown, internet access filtering system 100 comprises an access filter 102 that includes and is configured to manage at least one plurality of filter rulesets 106. Specifically, access filter 102 may be configured to store and/or organize filter rulesets 106 in one or more stacks of filter rulesets 108, with each stack of filter rulesets 108 being assigned to, and utilized to filter platform access requests 20 from, at least one respective user device 12. Each stack of filter rulesets 108 includes at least one, and optionally a plurality of, filter rulesets 106 that are selectively aggregated to generate an active aggregated filter ruleset 132, as discussed in more detail herein. That said, filter rulesets 106 of a stack of filter rulesets 108 may be stored in a non-aggregated state. In some examples, filter rulesets 106 of separate stacks of filter rulesets 108 may not be aggregated with one another. In other words, each stack of filter rulesets 108 may include all of the filter rulesets that are needed to produce an active aggregated filter ruleset 132 for filtering platform access attempts from a given user device 12 and/or at a given moment in time. Stack of filter rulesets 108 additionally or alternatively may be referred to herein as a set of filter rulesets, a folder of filter rulesets, a stack, a filter ruleset stack, and/or a group of filter rulesets.

Each stack of filter rulesets 108 may be customized, created, and/or managed for a particular user device 12. For examples in which internet access filtering system 100 is configured to filter platform access requests 20 from a plurality of different user devices 12, access filter 102 may include a plurality of stacks of filter rulesets 108 corresponding to the plurality of user devices 12. Additionally or alternatively, a single stack of filter rulesets 108 may be utilized to filter platform access requests 20 from more than one user device 12, or more than one user device 12 may be assigned to a given stack of filter rulesets 108. Access filter 102 may include a single stack of filter rulesets 108 for examples in which internet access filtering system 100 is installed on a user device 12, in which computing network 10 comprises a single user device 12, and/or in which a single stack of filter rulesets 108 is utilized to filter platform access requests 20 from each user device 12 in computing network 10. That said, internet access filtering system 100 may be configured to add stacks of filter rulesets 108 to and/or remove stacks of filter rulesets 108 from access filter 102 as needed, for example, to accommodate user devices 12 being added to or removed from computing network 10. Such operations may be performed responsive to control input from administrative device 14. Internet access filtering system 100 also may be configured to manage and/or modify a given stack of filter rulesets 108, such as discussed in more detail herein.

As shown in FIG. 2, each filter ruleset ($F_n$) 106 includes or is configured to store one or both of a corresponding list of allowed platforms 114 and a corresponding list of blocked platforms 118. Each filter ruleset 106 also may include, or be configured to store a corresponding list of allowed platform categories 122 and/or a corresponding list of blocked platform categories 126. Each filter ruleset 106 is assigned a respective priority within stack of filter rulesets 108. For example, stack of filter rulesets 108 may include a first lowest priority filter ruleset ($F_1$) 106, a second lowest priority filter ruleset ($F_2$) 106, optionally a third lowest priority filter ruleset ($F_3$) 106, and so on. The list of allowed platforms 114 of a given filter ruleset 106 may be referred to as the respective filter ruleset list of allowed platforms 114, or simply the $F_n$ list of allowed platforms 114, with the sub n indicating the priority or aggregation status of the filter ruleset. For example, the list of allowed platforms 114 of the first lowest priority filter ruleset 106 may be referred to as the $F_1$ list of allowed platforms. Likewise, the list of blocked platforms 118 of a given filter ruleset 106 may be referred to as the $F_n$ list of blocked platforms 118, the list of allowed platform categories 122 of a given filter ruleset 106 may be referred to as the $F_n$ list of allowed platform categories, and the list of blocked platform categories 126 of a given filter ruleset 106 may be referred to as the $F_n$ list of blocked platform categories 126.

Each filter ruleset 106 may be described as having a platform component 110 that contains list of allowed platforms 114 and list of blocked platforms 118 and as optionally including a platform category component 112 that contains list of allowed platform categories 122 and list of blocked platform categories 126. The platform components 110 of filter rulesets 106 may be aggregated with one another and the platform category components 112 of filter rulesets 106 may be aggregated with one another. The platform components 110 and platform category components 112 of filter rulesets 106 may be aggregated separately from one another. In other words, the lists of allowed and blocked platforms may be aggregated separately from the lists of allowed and blocked platform categories.

The lists (i.e., list of allowed platforms 114, list of blocked platforms 118, and so on) comprised in a given filter ruleset 106 may be different from the lists comprised in another filter ruleset 106 of the same stack of filter rulesets 108. That said, the lists of two filter rulesets 106 of a given stack of filter rulesets 108 may be overlapping, or list one or more of the same blocked platforms, one or more of the same blocked platform categories, and so on. One or more lists within a filter ruleset 106 may be empty. As referred to herein, an empty list does not list or include any platforms. For example, a particular filter ruleset 106 may include a list of blocked platforms 118 that is populated with platforms and an empty list of allowed platforms 114 that is not populated with platforms.

Stack of filter rulesets 108 may include any suitable number of filter rulesets 106. Each filter ruleset 106 may be created, configured, and/or managed for a particular scenario or function. For example, stack of filter rulesets 108 may include a filter ruleset 106 that establishes baseline rules for a given computing network 10, for example, by blocking platform access requests 20 to malicious platforms and by allowing any platform access requests 20 to non-malicious platforms. List of blocked platforms 118 of such a filter ruleset 106 may include malicious platforms, and list of allowed platform categories 124 of such a filter ruleset 106 may include a safe or non-malicious platform category.

Stack of filter rulesets 108 also may include filter rulesets 106 that are particular to a given user device 12. For example, a filter ruleset 106 may be a child-related or an age-related filter ruleset 106, including children-appropriate platforms on list of allowed platforms 114, platforms presenting adult content on list of blocked platforms 118 and/or adult platforms in list of blocked platform categories 126. Stack of filter rulesets 108 also may include filter rulesets that are designed for, and/or included in stack of filter rulesets 108 during, a particular segment of time or period of activity. For example, stack of filter rulesets 108 may include a focus filter ruleset 106 that functions to block distracting platforms and allow productive, educational, or informational platforms. As another example, stack of filter rulesets 108 may include a school, homework, or test-related filter ruleset 106 that is configured to block platform access requests 20 to platforms that should not be allowed during these activities and allow platform access requests 20 to platforms that are permissible for use during these activities.

Filter rulesets 106 may be added to, removed from, and/or modified in stack of filter ruleset 108 based on any suitable criteria. For example, one or more filter rulesets 106 may be added to or removed from stack of filter rulesets 108 based on a pre-established schedule. For example, a focus filter ruleset 106 may be automatically added to a stack of filter rulesets 108 during a selected time frame (e.g., dinner time) and removed from the stack of filter rulesets 108 outside of the selected time frame. As another example, a homework filter ruleset 106 may be automatically added to a stack of filter rulesets 108 during a selected time frame (e.g., between 3:30 PM and 5:30 PM) and removed from the stack of filter rulesets 108 outside of this selected time frame. Filter rulesets 106 also may be added to or removed from stack of filter rulesets 108 at the control of administrative device 14. In some examples, filter rulesets 106 of stack of filter rulesets 108 are stored in a non-aggregated, or discrete state, such as to allow filter rulesets 106 to be added to or removed from the stack of filter rulesets 108 in an efficient manner. In other words, storing filter rulesets 106 of stack of filter rulesets 108 separately and then aggregating the filter rulesets 106 on demand may permit changes to the filter rulesets at any priority while still respecting filter rulesets 106 of higher priority.

As shown in FIG. 2, internet access filtering system 100 may include filter ruleset library 140. Filter ruleset library 140 may store complete, or preformed, inactive filter rulesets 142. As utilized herein, an inactive filter ruleset 142 is a filter ruleset 106 that is not included in a stack of filter rulesets 108. In some examples, inactive filter rulesets 142 may be selectively populated into a selected stack of filter rulesets 108 from filter ruleset library 140, for example, based on a predefined schedule and/or at the control of administrative device 14. Filter ruleset library 140 also may include individual allowed platforms 116, blocked platforms 120, blocked platform categories 128, and/or allowed platform categories 124 that may be selectively added to any given filter ruleset 106 as needed. Additionally or alternatively, filter rulesets 106 may be loaded from an outside source (e.g., via the Internet 18) into a given stack of filter rulesets 108 and/or into filter ruleset library 140.

Access filter 102 further comprises a combination operator 104 that is configured to aggregate the plurality of filter rulesets 106 of stack of filter rulesets 108 in a hierarchical, priority-ordered combination to produce active aggregated filter ruleset ($F_A$) 132, which is utilized to filter platform access requests 20, as discussed herein. More specifically, combination operator 104 may include computer-readable instructions that cause processing unit 202 to perform methods 600 on filter rulesets 106, such as illustrated and discussed in more detail herein with reference to FIG. 5.

In some examples, conflicts exist between filter rulesets 106 of a given stack of filter rulesets 108, and combination operator 104 may be configured to aggregate filter rulesets 106 in a manner that resolves any such conflicts. An example of a conflict between filter rulesets 106 is a platform being included in list of allowed platforms 114 of one filter ruleset 106 while also being included in list of blocked platforms 118 of another filter ruleset 106. More specifically, the priority-ordered combination of filter rulesets 106 may resolve any such conflict.

Combination operator 104 being configured to aggregate filter rulesets in a hierarchical, priority-ordered manner means that the two lowest priority filter rulesets 106 are combined first to produce an aggregated filter ruleset ($F_c$). If stack of filter rulesets 108 includes an additional, or next lowest priority filter ruleset, the aggregated filter ruleset produced by combining the two lowest priority filter rulesets is assigned the lowest priority and then aggregated with the next lowest priority filter ruleset according to the same rules. Combination operator 104 also may dedupe, or remove duplicates, from the aggregated filter ruleset, for example, if the combination results in a given platform being added more than once to a given list of aggregated filter ruleset. Combination operator 104 is configured to repeat this process until the plurality of filter rulesets are aggregated to form the active aggregated filter ruleset. Specifically, for a stack of filter rulesets 108 that has N filter rulesets 106, this process is repeated N−2 times.

The rules for combining the two lowest priority filter rulesets ($F_1$, $F_2$) to create the aggregated filter ruleset ($F_v$) are as follows: (i) any platforms listed in the $F_1$ list of allowed platforms that also are listed in the $F_1$ list of blocked platforms are removed from the $F_1$ list of allowed platforms, and all platforms listed in the $F_2$ list of allowed platforms are added to the $F_1$ list of allowed platforms to create the $F_c$ list of allowed platforms; and (ii) any platforms listed in the $F_2$ list of allowed platforms that also are listed in the $F_1$ list of blocked platforms are removed from the $F_1$ list of blocked platforms, and all platforms listed in the $F_2$ list of blocked platforms are added to the $F_1$ list of blocked platforms to create the $F_c$ list of blocked platforms.

Thus, stated in more general terms, the second lowest priority filter ruleset 106 is given priority over the lowest priority filter ruleset 106 in the combination to resolve any conflicts between their respective lists. If stack of filter rulesets 108 includes a next lowest priority filter ruleset 106, the aggregated filter ruleset is treated as the lowest priority filter ruleset 106 as described in the combination rules above, and the next lowest priority ruleset 106 is treated as the second lowest priority ruleset. If the stack of filter rulesets 108 includes only two filter rulesets 106, then the aggregated filter ruleset produced by this combination is active aggregated filter ruleset 132. Accordingly, active aggregated filter ruleset 132 comprises an $F_A$ list of allowed platforms 114, an $F_A$ list of blocked platforms 118, optionally an $F_A$ list of allowed platform categories 122, and optionally an $F_A$ list of blocked platform categories 126 that are created by the hierarchical, priority-ordered combination of all filter rulesets 106 comprised in a stack of filter rulesets.

Equation 2 expresses the combination rules described herein in set standard syntax.

$$A_c = (A_1 - B_1) \cup (A_2 - B_2)$$

$$B_c = (B_1 - A_2) \cup B_2 \tag{1}$$

Where $A_c$ is the $F_c$ list of allowed categories, $B_c$ is the $F_c$ list of blocked categories, $A_1$ is the $F_1$ list of allowed platform categories, $B_1$ is the $F_1$ list of blocked categories, $A_2$ is the $F_2$ list of allowed categories, and $B_2$ is the $F_2$ list of blocked categories.

The combination rules expressed above in relation to platform components 110 of filter rulesets 106 are applied in an analogous manner to aggregate platform category components 112 of filter rulesets 106.

Combination operator 104 also may be configured to maintain original versions of filter rulesets 106 that are combined. More specifically, while combination operator 104 is discussed herein as adding platforms to and removing platforms from the list of a particular filter ruleset 106, combination operator 104 may be configured to create copies of filter rulesets 106 and/or the lists thereof and perform these operations on the copies, such that the original versions of filter rulesets 106 are unmodified by the combination. This may allow filter rulesets 106 to be stored in a non-aggregated state and aggregated as needed without modifying the non-aggregated filter rulesets.

The priority of each filter ruleset 106 within stack of filter rulesets 108 may be assigned based on any suitable criteria. For example, the respective priorities of filter rulesets 106 within a given stack of filter rulesets 108 may be assigned based on criteria such as the order in which the filter rulesets are added to stack of filter rulesets 108 (e.g., with the oldest filter ruleset 106 assigned the lowest priority), at the control of administrative device 14, and/or with a pre-established priority (e.g., a given filter ruleset 106 may be configured to assume a preselected priority when added to any given stack of filter rulesets).

With continued reference to FIG. 2, internet access filtering system 100 further includes a filter operator 134. Filter operator 134 is configured to process platform access request 20 when received from user device 12 through the appropriate active aggregated filter ruleset 132. Specifically, filter operator 134 is configured to determine whether to allow or block platform access request 20 based upon a comparison of platform access request 20 to the aggregated filter ruleset according to the rules set forth below. In particular, filter operator 134 may include computer-readable instructions that cause processing unit 202 to perform at least a portion of methods 500, such as illustrated and discussed in more detail herein with reference to FIG. 4.

More specifically, filter operator 134 is configured to determine whether the requested platform of a platform access request 20 is listed in the $F_A$ list of blocked platforms 118 and block the platform access request 20 if the requested platform is in the $F_A$ list of blocked platforms 118. If the requested platform is not listed in the $F_A$ list of blocked platforms 118, the filter operator 134 is configured to determine whether the requested platform is listed in the $F_A$ list of allowed platforms 114 and allow the platform access request 20 if the requested platform is in the $F_A$ list of allowed platforms 114.

In some examples, filter operator 134 is configured to check the platform category of the requested platform against platform category component 112 of active aggregated filter ruleset 132 when the requested platform is listed in neither of the $F_A$ list of allowed platforms 114 nor the $F_A$ list of blocked platforms 118. More specifically, if the requested platform is not listed in the $F_A$ list of allowed platforms or the $F_A$ list of blocked platforms, filter operator 134 may be configured to determine whether the platform category of the requested platform is listed in the $F_A$ list of blocked platform categories 126 and block the platform access request 20 if the platform category is listed in the $F_A$ list of blocked platform categories 126. In such examples, if the platform category of the requested platform is not listed in the $F_A$ list of blocked platform categories 126, filter operator 134 is configured to determine whether the platform category of the platform category of the requested platform is listed in the $F_A$ list of allowed platform categories 122 and allow the platform access request if the platform category is listed in the $F_A$ list of allowed platform categories 122. If filter operator 134 determines that the platform category of the requested platform is not listed in the $F_A$ list of allowed platform categories 124, then filter operator 134 is configured to block the platform access request 20. In other words, filter operator 134 will block the platform access request if the requested platform is in neither of the $F_A$ list of allowed platform categories 122 nor the $F_A$ list of blocked platform categories 126.

Thus, considering a given stack of filter rulesets 108 including two filter rulesets ($F_1$, $F_2$) 106, the combined operations of combination operator 104 and filter operator 134 yield the following outcome: (1) each platform listed in the $F_1$ list of allowed platforms 114 will be allowed in filter operator 134 unless it is listed in either of the $F_1$ list of blocked platforms 118 or the $F_2$ list of blocked platforms 118, (2) each platform listed in the $F_1$ list of blocked platforms 118 will be blocked in filter operator 134 unless it is listed in the $F_2$ list of allowed platforms 114, (3) each platform listed in the $F_2$ list of allowed platforms 114 will allowed in filter operator 134 unless it is listed in the $F_2$ list of blocked platforms 118, and (4) each platform listed in the $F_2$ list of blocked platforms 118 will be blocked in filter operator 134.

Internet access filtering systems 100 may provide several benefits over existing internet filtering strategies. For example, the use of parallel platform lists and category lists in the filter rulesets permits high-level control over what platforms are allowed and blocked as well as more granular configuration. Additionally, internet access filtering system 100 may be configured to utilize a limited number of platform categories that can easily be applied to define allowed and blocked platforms, which obviates the need to create an impossibly exhaustive list of platforms to be allowed or blocked. Moreover, the priority-ordered, hierarchical combination of filter rulesets 106 utilized in internet access filtering system 100 allows for dynamic updating of curated allowed lists and blocked lists while still deferring to higher priority filter rulesets.

Figure 3:
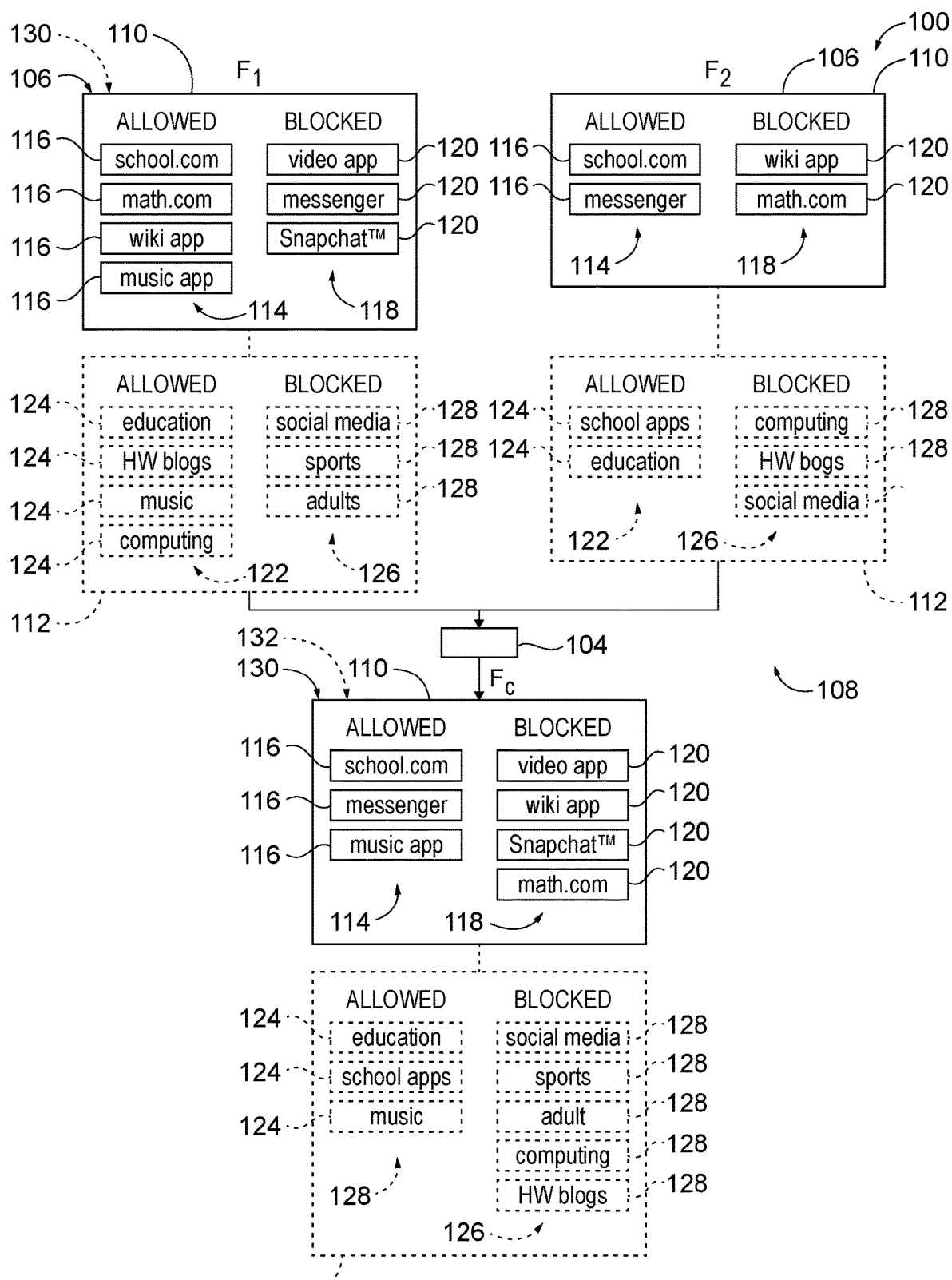
FIG. 3 is a schematic representation of examples of aggregating filter rulesets according to the present disclosure.

FIG. 3 is a schematic representation providing illustrative, non-exclusive examples of aggregating filter rulesets according to the present disclosure. Specifically, FIG. 3 illustrates an example of aggregating two filter rulesets 106, including a first lowest priority filter ruleset ($F_1$) 106 and a second lowest priority filter ruleset ($F_2$) 106. The first lowest priority filter ruleset $F_1$ may be an aggregated filter ruleset 130 produced by combining two filter rulesets, as discussed herein. In other words, FIG. 3 may illustrate a first combination of filter rulesets 106 within a stack of filter rulesets, or FIG. 3 may illustrate a subsequent combination of aggregated filter ruleset 130 with a next lowest priority filter ruleset.

As shown, each filter ruleset 106 includes a respective list of allowed platforms 114 that lists one or more allowed platforms 116 and a respective list of blocked platforms 118 that lists one or more blocked platforms 120. These lists of each filter ruleset 106 collectively comprise platform component 110. Each filter ruleset 106 also may include platform category component 112 comprising a respective list of allowed platform categories 122 that lists one or more allowed platform categories 124, and a respective list of blocked platform categories 126 that lists one or more blocked platform categories 128. These filter rulesets 106 are combined by combination operator 104 to produce aggregated filter ruleset 130.

The aggregated filter ruleset 130 as produced by the combination of filter rulesets 106 may be an active aggregated filter ruleset 132 when stack of filter rulesets 108 only comprises the two filter rulesets 106 shown, or when the second lowest priority filter ruleset 106 is the highest priority filter ruleset 106 within stack of filter rulesets 108. In the latter case, the second lowest priority filter ruleset 106 is designated as such within this particular combination, but may be the third, fourth, fifth, . . . or Nth lowest priority filter ruleset depending on the number of previous combinations executed to generate the aggregated filter ruleset 130 that is designated as the first lowest priority filter ruleset within the context of this combination.

In the examples of FIG. 3, the first lowest priority filter ruleset 106 may be a homework-oriented filter ruleset that may applied for the user device of a child or student during a scheduled homework time. When this filter ruleset 106 is an aggregated filter ruleset 130, it also may include blocked or allowed platforms or platform categories inherited from a base filter ruleset that is always present in stack of filter rulesets 108 (e.g., the child is blocked from accessing adult websites in the base filter ruleset). In the specific examples shown, the $F_1$ list of allowed platforms 114 includes the following illustrative, example platforms: the child's school website (school.com), a graphing website (math.com), a wiki app, and a music app, while the $F_1$ list of blocked platforms includes the following illustrative, example platforms: a video app, a messenger platform, and Snapchat™. The first lowest priority filter ruleset also may include platform category component 112 with the $F_1$ list of allowed platform categories 122 including, for example, educational platforms, homework blog platforms, music app platforms, and computational platforms, and the $F_1$ list of blocked platform categories 126 including, for example, social media platforms, sports platforms, and adult platforms.

The second lowest priority filter ruleset 106 may be, for example, a homework exercise-specific filter ruleset designed by the student's school for a particular homework assignment. For example, this homework exercise may allow students to collaborate over messenger, but may not allow students to access certain platforms that would permit cheating on the homework assignment. In the illustrated example, the $F_2$ list of allowed platforms 114 includes the school website (school.com) and the messenger platform, while the $F_2$ list of blocked platforms 118 includes the wiki app and the graphing website (math.com). The second lowest priority filter ruleset also may include platform category component 112 with the $F_2$ list of allowed platform categories including educational platforms, and the school's apps, and the $F_2$ list of blocked platform categories 126 including computational platforms, homework blog platforms, and social media platforms.

As shown, conflicts exist between the two filter rulesets 106, namely math.com and the wiki app are included in the $F_1$ list of allowed platforms 114 but listed in $F_2$ list of blocked platforms. Similarly, homework blog platforms and computational platforms are listed in the $F_1$ list of allowed platform categories 122 but listed in the $F_2$ list of blocked platform categories 126. Internet access filtering system 100 according to the present disclosure resolves these conflicts by combining the two filter rulesets in the priority-ordered hierarchical combination discussed herein. In less rigid terms, the second lowest priority filter ruleset 106 is given priority over the first lowest priority filter ruleset in the combination, which resolves these issues.

The aggregated filter ruleset 130 produced by this combination includes school.com, the messenger platform, and the music app in the $F_c$ list of allowed platforms 114, and includes the video app platform, the wiki app, Snapchat™, and math.com in the $F_c$ list of blocked platforms 118. For examples in which the filter rulesets 106 include platform category components 112, the $F_c$ list of allowed platform categories 122 includes the educational platforms, the schools apps, and music platforms, and the $F_c$ list of blocked platform categories 126 includes social media platforms, sports platforms, adult platforms, computational platforms, and homework blog platforms. For examples in which the aggregated filter ruleset 130 is the active aggregated filter ruleset 132, the child, for example, would be allowed to message their classmates using the messenger app to do the homework assignment against the rules of the first lowest priority filter ruleset but would not be allowed to access adult sites, sports sites, etc. per the rules of the first lowest priority filter ruleset. The child also would be allowed to listen to music while doing the homework assignment per the rules of the first lowest priority filter ruleset, and the absence of music-related apps in the second lowest priority filter ruleset.

Internet access filtering system 100 and various components or elements of internet access filtering system 100 (e.g., access filter 102, combination operator 104, etc.) are discussed herein as being configured to perform one or more functions. Internet access filtering system 100 and the components thereof may be implemented in hardware, software, or a combination thereof. In the context of software, the various components of internet access filtering system 100, such as those illustrated in FIGS. 1-3, represent computer-executable instructions stored on one or more computer-readable storage media that, when executed by a processing unit or one or more processors, perform the disclosed or recited functions. Thus, internet access filtering system 100 and/or a particular component thereof being described herein as "configured to" perform a particular function may be understood to mean that internet access filtering system 100 and/or the particular component thereof is configured to cause the performance of the particular function when executed by a processing unit or one or more processors.

Figure 4:
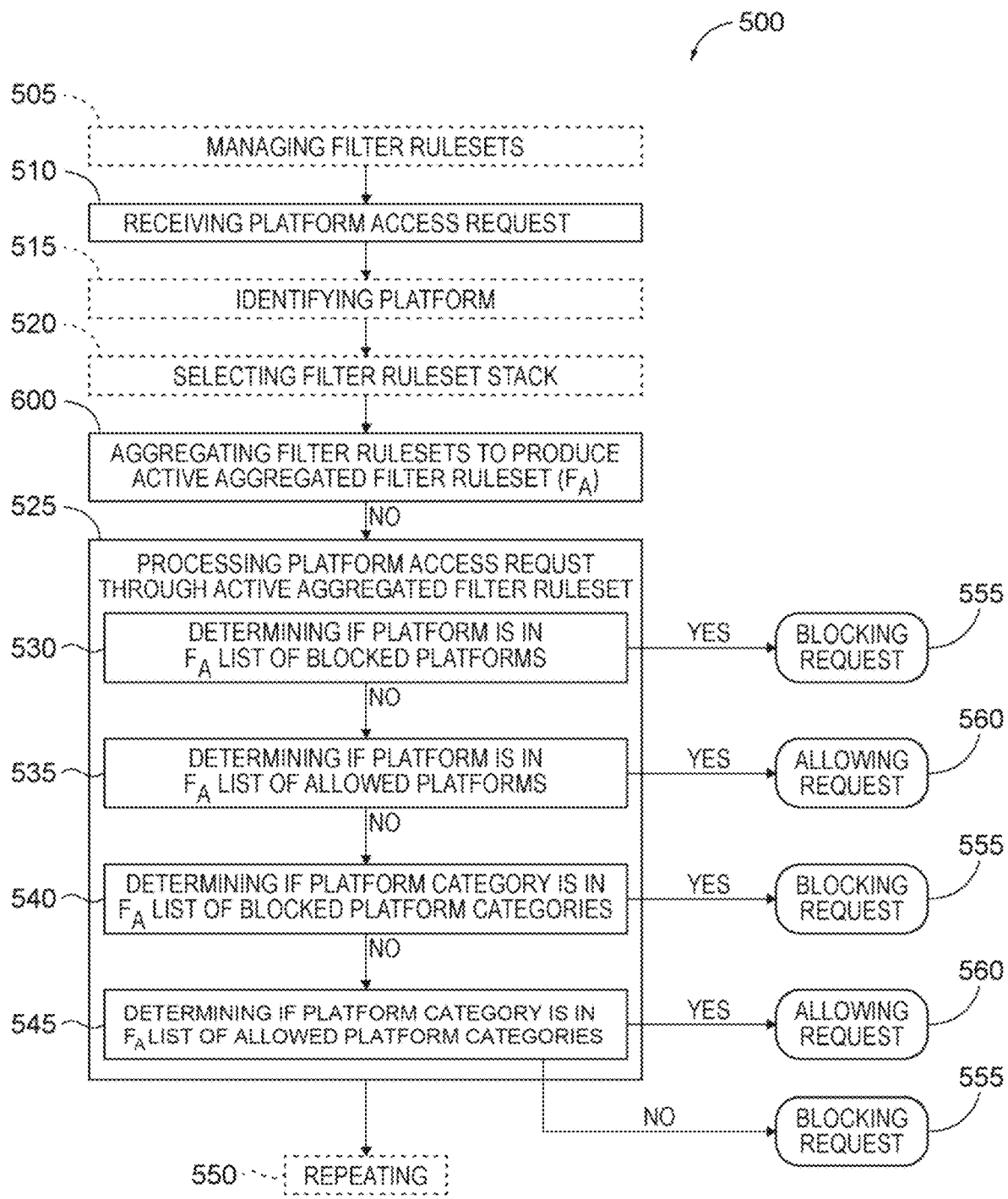
FIG. 4 is a flowchart schematically representing examples of methods of filtering internet access requests according to the present disclosure.
Figure 5:
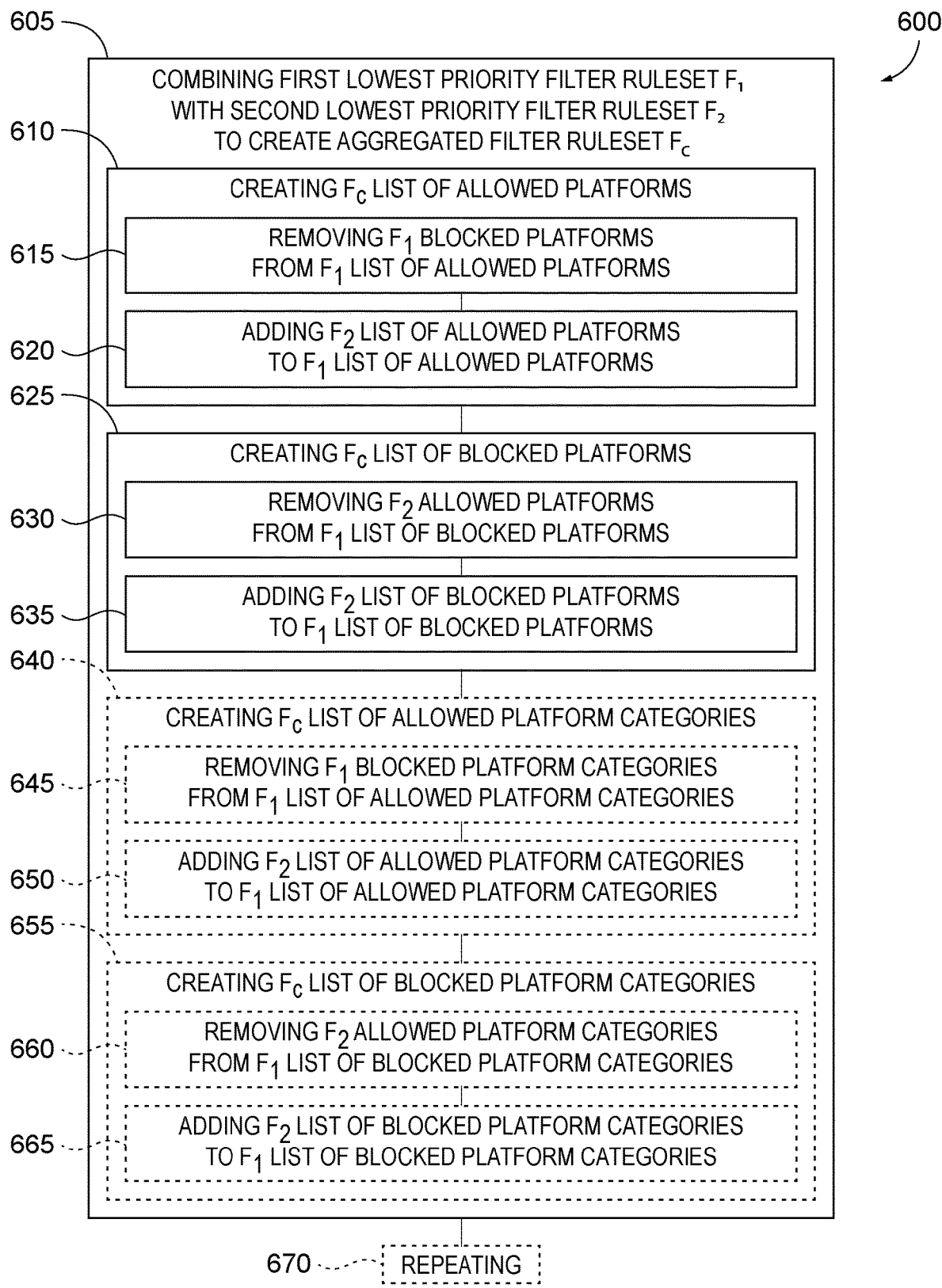
FIG. 5 is a flowchart schematically representing examples of aggregating a plurality of filter rulesets according to the present disclosure.

FIG. 4 is a flowchart schematically representing examples of computing device implemented methods 500 of filtering internet access requests, and FIG. 5 is a flowchart schematically representing examples of computing device implemented methods 600 of aggregating a plurality of filter rulesets to produce an active aggregated filter ruleset according to the present disclosure. In FIGS. 4 and 5, some steps are illustrated in dashed boxes, indicating that such steps may be optional or may correspond to an optional version of methods 500 or methods 600. That said, not all methods 500 and methods 600 are required to include each step illustrated in solid boxes. The methods and steps of FIGS. 4 and 5 are not limiting, and other methods and steps are within the scope of the present disclosure, including methods having greater than or fewer than the number of steps illustrated, as understood from the discussion herein. Each step or portion of methods 500 and/or methods 600 may be performed utilizing internet access filtering systems 100, access control computing devices 200, and/or within computing networks 10 as illustrated and discussed herein with reference to FIGS. 1-3. Likewise, any of the features, functions, structures, configurations, characteristics, properties, variants, options, etc. of internet access filtering systems 100, access control computing devices 200, and/or computing networks 10 that are discussed herein with reference to FIG. 4 and methods 500 and/or FIG. 5 and methods 600 may be included in or utilized with internet access filtering systems 100, access control computing devices 200, and/or within computing networks 10 according to FIGS. 1-3.

With initial reference to FIG. 4, methods 500 comprise receiving 510 a platform access request to access a requested platform, aggregating 600 a plurality of filter rulesets to produce an active aggregated filter ruleset ($F_A$), and processing 525 the platform access request through the active aggregated filter ruleset. The processing 525 comprises determining 530 if the requested platform is in an $F_A$ list of blocked platforms, and determining 535 if the requested platform is in a $F_A$ list of allowed platforms. The processing may comprise determining 540 if a platform category of the requested platform is in an $F_A$ list of blocked platform categories and determining 545 if the platform category of the requested platform is in an $F_A$ list of allowed platform categories. Methods 500 may include managing 505 the filter rulesets, identifying 515 the requested platform, selecting 520 a filter ruleset stack, and/or repeating 550.

In some examples, methods 500 comprise managing 505 the plurality of filter rulesets 106. The managing 505 may include storing and/or organizing the plurality of filter rulesets as a stack of filter rulesets 108. In some examples, the managing 505 comprises storing the filter rulesets 106 of the stack of filter rulesets 108 in a non-aggregated state, or as individual filter rulesets 106, as discussed herein. In some examples, the managing 505 comprises modifying the plurality of filter rulesets 106. For example, the modifying may include adding at least one new filter ruleset 106 to the plurality of filter rulesets 106 and/or removing at least one filter ruleset 106 from the plurality of filer rulesets 106. As a more specific example, the modifying may be performed automatically based on a pre-established schedule, as discussed herein. Additionally or alternatively, the modifying may be performed at the control of an administrative device 14. In some examples, the managing comprises receiving at least one filter ruleset 106 from a third party and adding the at least one filter ruleset 106 to the plurality of filter rulesets 106.

The managing 505 also may include altering any given filter ruleset 106. For example, the altering may include adding at least one platform to and/or removing at least one platform from the list of allowed platforms 114 of any given filter ruleset, adding at least one platform to and/or removing at least one platform from the list of blocked platforms 118 of any given filter ruleset, adding at least one platform category to and/or removing at least one platform category from the list of allowed platform categories 122 of any given filter ruleset 106 and/or adding at least one platform category to and/or removing at least one platform category from the list of blocked platform categories 126 of any given filter ruleset 106.

In some examples, the managing 505 comprises creating a new filter ruleset and adding the new filter ruleset 106 to the plurality of filter rulesets 106. In some examples, the creating comprises compiling a respective list of allowed platforms and a respective list of blocked platforms for the new filter ruleset. In some examples, the managing 505 comprises creating a plurality of new filter rulesets 106.

The managing 505 further may include assigning a respective priority to each filter ruleset 106. As mentioned, the assigning may be performed based on any suitable criteria, such as a preassigned priority of a given filter ruleset 106, based on the order in which the filter rulesets 106 are added to the stack of filter rulesets 108, and/or at the control of the administrative device 14. The managing may be performed with any suitable sequence or timing within methods 500, such as prior to aggregating 600 and/or processing 525.

As shown in FIG. 4, methods 500 include receiving 510 a platform access request to access a requested platform. As discussed herein, the receiving 510 may include receiving the platform access request 20 from a user device 12, such as one within computing network 10. The requested platform may include any of the examples of platforms discussed herein and others not explicitly discussed herein. The receiving 510 may include receiving information regarding the requested platform (e.g., a domain name or an IP address, as well as protocol and port information). The receiving 510 may be performed with any suitable sequence or timing within methods 500, such as prior to the identifying 515, prior to the aggregating 600, and/or prior to the processing 525.

In some examples, methods 500 comprise identifying 515 the requested platform indicated in the platform access request. In some examples, the identifying 515 comprises querying a platform database 222 for an identity of the requested platform and receiving the identity of the requested platform from the platform database 222, as discussed herein. In some examples, the querying comprises providing the information relating to the requested platform of the platform access request to the platform database 222. Additionally or alternatively, the identifying 515 may comprise obtaining a platform category of the requested platform. The obtaining may comprise querying a categorization engine 220 for the platform category of the requested platform, and receiving the platform category of the requested platform from the categorization engine 220, as discussed herein. The identifying 515 may be performed with any suitable sequence or timing within methods 500, such as subsequent to the receiving 510, prior to the selecting 520 prior to the aggregating 600, and/or prior to the processing 525.

In some examples, methods 500 comprise selecting 520 an appropriate stack of filter rulesets 108. As discussed herein, the internet access filtering system 100 may include a plurality of stacks of filter rulesets 108, where each stack of filter rulesets 108 may be assigned to a particular user device 12 and/or a particular group of user devices 12. Thus, in some examples, the selecting 520 comprises selecting the stack of filter rulesets 108 that is assigned to the user device 12 from which the platform access request 20 is received. In some such examples, the selecting 520 comprises identifying the user device 12 from which the platform access request is received and selecting the appropriate stack of filter rulesets 108 based on this identification. For examples in which methods 500 comprise the selecting 520, the plurality of filter rulesets aggregated at 600 are the filter rulesets 106 of the stack of filter rulesets 108 selected at 520. Thus, the selecting 520 may be performed prior to aggregating 600 and/or subsequent to the receiving 510.

Methods 500 further comprise aggregating 600 the plurality of filter rulesets to produce an active aggregated filter ruleset. More specifically, as discussed herein, each filter ruleset ($F_n$) 106 is assigned a respective priority and comprises a respective $F_n$ list of allowed platforms 114, a respective $F_n$ list of blocked platforms 118, optionally a respective $F_n$ list of allowed platform categories 122, and optionally a respective $F_n$ list of blocked platform categories 126. The active aggregated filter ruleset ($F_A$) 132 comprises an $F_A$ list of allowed platforms 114, and an $F_A$ list of blocked platforms 118 that are created by the hierarchical, priority-ordered combination of the $F_n$ lists of allowed platforms 114 and the $F_n$ lists of blocked platforms 118 of the plurality of filter rulesets 106. For examples in which at least one of the filter ruleset 106 comprises a respective $F_n$ list of allowed platform categories 122, and/or a respective $F_n$ list of blocked platform categories 126, the active aggregated filter ruleset 132 further comprises an $F_A$ list of allowed platform categories 122 and/or an $F_A$ list of blocked platform categories 126 that are created by the hierarchical, priority-ordered combination of the $F_n$ lists of allowed platform categories and the $F_n$ lists of blocked platform categories of the plurality of filter rulesets 106.

More specific examples of the aggregating 600 are illustrated and discussed herein with reference to FIG. 5 and methods 600. The aggregating 600 of methods 500 may include performing any of the methods 600 that are illustrated and discussed herein with reference to FIG. 5. In particular, the aggregating 600 of methods 500 may include performing any suitable combination of steps of methods 600 that are illustrated in and discussed herein with reference to FIG. 5 to aggregate the plurality of filter rulesets 106.

Methods 500 further comprise processing 525 the platform access request through the active aggregated filter ruleset generated at the aggregating 600. The processing 525 comprises determining 530 if the requested platform of the platform access request is in the $F_A$ list of blocked platforms and blocking 555 the platform access request if the requested platform is in the $F_A$ list of blocked platforms. The processing 525 further includes determining 535 if the requested platform is in the $F_A$ list of allowed platforms and allowing 560 the platform access request if the requested platform is in the $F_A$ list of allowed platforms. The determining 530 may be performed prior to the determining 535. More specifically, the processing 525 may only include the determining 535 if the determining 530 comprises determining that the requested platform is not in the $F_A$ list of blocked platforms. As referred to herein, a particular method step being performed "if" another specified, or preceding, method step has a specified result additionally or alternatively may be described as the particular method step being performed responsive to the other specified method step having the specified result. Thus, as a more specific example, the processing 525 may be described as comprising performing the determining 535 responsive to determining 530 that the requested platform is not in the $F_A$ list of blocked platforms.

The processing 525 further may include determining 540 if the platform category of the requested platform is in the $F_A$ list of blocked platform categories and blocking 555 the platform access request when the platform category is in the $F_A$ list of blocked platform categories. The processing 525 may only include the determining 540 when the determining 535 includes determining that the requested platform is not in the $F_A$ list of allowed platforms 114. In other words, the processing 525 may only include the determining 540 when the processing 525 comprises determining that the requested platform is in neither of the $F_A$ list of allowed platforms 114 nor the $F_A$ list of blocked platforms 118.

For some examples in which the active aggregated filter ruleset 132 does not include a platform category component 112, the processing 525 includes blocking 555 the platform access request upon determining that the requested platform is in neither of the neither of the $F_A$ list of allowed platforms 114 nor the $F_A$ list of blocked platforms 118. Additionally or alternatively, in some examples, the identifying 515 comprises receiving a notification from the categorization engine 220 that the platform category of the requested platform is unknown or indecipherable. In some such examples, the processing 525 comprises blocking 555 the platform access request upon determining that the requested platform is in neither of the $F_A$ list of allowed platforms 114 nor the $F_A$ list of blocked platforms 118.

The processing 525 further may include determining 545 if the platform category of the requested platform is in the $F_A$ list of allowed platform categories and allowing 560 the platform access request if the platform category of the requested platform is in the $F_A$ list of allowed platform categories and blocking 555 the platform access request if the platform category of the requested platform is not in the $F_A$ list of allowed platform categories. The determining 545 may be performed subsequent to the determining 540. In other words, the processing 525 may only include the determining 545 if the determining 540 comprises determining that the platform category of the requested platform is not in the $F_A$ list of blocked platform categories 126. Thus, the processing 525 may include blocking 555 the platform access request upon determining that the platform category of the requested platform is in neither of the $F_A$ list of blocked platforms nor the $F_A$ list of allowed platforms.

In some examples, the $F_n$ list of allowed platforms 114 and the $F_n$ list of blocked platforms 118 of each filter ruleset 106 are empty such that the $F_A$ list of allowed platforms 114 and the $F_A$ list of blocked platforms 118 are empty. In such examples, the processing 525 comprises determining that the requested platform is in neither of the $F_A$ list of allowed platforms 114 nor the $F_A$ list of blocked platforms 118 and the processing 525 comprises blocking 555 or allowing 560 the platform access request 20 solely based on the platform category of the requested platform. In other words, methods 500 may be operable to filter platform access requests based on platform category alone. The processing 525 may be performed with any suitable sequence or timing within methods 500, such as subsequent to the aggregating 600 and/or prior to the repeating 550.

Methods 500 further may include repeating 550. The repeating 550 may be performed to filter a new platform access request 20 or upon receiving 510 a new platform access request 20. The repeating 550 may include repeating any suitable combination of steps of methods 500 in the same or in a different manner. Specifically, the new platform access request may be for a different requested platform and thus, the repeating 550 the processing 525 may have a different outcome. Additionally or alternatively, the repeating 550 may be performed within a different timeframe. As mentioned, the managing 505 may include modifying the plurality of filter rulesets 106 based on a schedule. Thus, the filter rulesets 106 aggregated during the repeating 550 may be different, and the repeating 550 the processing 525 may have a different outcome, even if the requested platform of the new platform access request is the same platform originally requested. As another example, the repeating 550 may include receiving 510 a platform access request 20 from a new user device 12 and the selecting 520 may include selecting a different stack of filter rulesets 108 corresponding to the new user device 12. In such examples, the stack of filter rulesets 108 selected during the repeating 550 the selecting 520 may have different filter rulesets 106, such that the repeating 550 the processing 525 may have a different outcome, even if the requested platform of the new platform access request received is the same platform received from the original user device 12.

FIG. 5 is a flowchart schematically representing examples of computing device implemented methods 600 of aggregating a plurality of filter rulesets to produce an active aggregated filter ruleset. More specifically, the plurality of filter rulesets 106 comprises N filter rulesets that may be organized or stored in a stack of filter rulesets 108, as discussed herein. Each filter ruleset ($F_n$) 106 is assigned a respective priority and comprises an $F_n$ list of allowed platforms and an $F_n$ list of blocked platforms. As shown in FIG. 5, methods 600 comprise combining 605 a first lowest priority filter ruleset ($F_1$) with a second lowest priority filter ruleset ($F_2$) to produce an aggregated filter ruleset ($F_c$) having an $F_c$ list of allowed platforms and a $F_c$ list of blocked platforms.

More specifically, the combining 605 comprises creating 610 the $F_c$ list of allowed platforms. The creating 610 comprises removing 615 any blocked platforms of the $F_1$ list of blocked platforms from the $F_1$ list of allowed platforms. In other words, the removing 615 comprises removing any platforms from the $F_1$ list of allowed platforms 114 that also are listed in the $F_1$ list of blocked platforms 118. The removing 615 may be performed for examples in which the lowest priority filter ruleset is not normalized. In other words, the removing 615 may be performed for examples in which the $F_1$ list of allowed platforms 114 includes at least one platform that also is listed in the $F_1$ list of blocked platforms 118. The creating 610 also comprises adding 620 all allowed platforms of the $F_2$ list of allowed platforms to the $F_1$ list of allowed platforms. The adding 620 may be performed subsequent to the removing 615.

The combining 605 further comprises creating 625 the $F_c$ list of blocked platforms. The creating 625 comprises removing 630 removing any allowed platforms of the $F_2$ list of allowed platforms from the $F_1$ list of blocked platforms. In other words, the removing 630 comprises removing any platforms from the $F_1$ list of blocked platforms 118 that also are included in the $F_2$ list of allowed platforms 114. The creating 625 also comprises adding 635 all blocked platforms of the $F_2$ list of blocked platforms to the $F_1$ list of blocked platforms. In other words, the adding 635 comprises adding the $F_2$ list of blocked platforms 118 to the $F_1$ list of blocked platforms 118. The adding 635 may be performed subsequent to the removing 630.

With continued reference to FIG. 5, the combining 605 may include creating 640 an $F_c$ list of allowed platform categories and creating 655 an $F_c$ list of blocked platform categories. More specifically, the combining 605 includes the creating 640 and the creating 655 for examples in which the filter rulesets 106 comprise the platform category component 112 discussed herein. The creating 640 may be performed in a similar manner to the creating 610 and the creating 655 may be performed in a similar manner to the creating 625.

As shown, the creating 640 the $F_c$ list of allowed platform categories comprises removing 645 any blocked platform categories of the $F_1$ list of blocked platform categories from the $F_1$ list of allowed platform categories. In other words, the removing 645 comprises removing any platform categories from the $F_1$ list of allowed platform categories 122 that are listed in both of the $F_1$ list of blocked platform categories 126 and in the $F_1$ list of allowed platform categories 122. The removing 645 may be performed for examples in which the lowest priority filter ruleset is not normalized, as discussed herein. The creating 640 also comprises adding 650 all platform categories of the $F_2$ list of allowed platform categories to the $F_1$ list of allowed platform categories. In other words, the adding 650 may include adding the $F_2$ list of allowed platform categories 122 to the $F_1$ list of allowed platform categories 122.

The creating 655 the $F_c$ list of blocked platform categories comprises removing 660 any allowed platform categories of the $F_2$ list of allowed platform categories from the $F_1$ list of blocked platform categories. In other words, the removing 660 comprises removing any platform categories from the $F_1$ list of allowed platform categories 122 that also are listed in the $F_2$ list of blocked platform categories 126. The creating 655 further comprises adding 665 all platform categories of the $F_2$ list of blocked platform categories to the $F_1$ list of blocked platform categories. In other words, the adding 665 comprises adding the $F_2$ list of blocked platform categories 126 to the $F_1$ list of blocked platform categories 126.

The combining 605 further may include normalizing the aggregated filter ruleset. More specifically, the normalizing may include removing any blocked platforms of the $F_c$ list of blocked platforms from the $F_c$ list of allowed platforms. In other words, the normalizing may include removing any platforms from the $F_c$ list of allowed platforms 114 that also are listed in the $F_c$ list of blocked platforms 118. The normalizing may be performed for examples in which at least one platform is listed in both of the $F_c$ list of allowed platforms 114 and the $F_c$ list of blocked platforms 118. The normalizing additionally or alternatively may include removing any blocked platform categories of the $F_c$ list of blocked platform categories 126 from the $F_c$ list of allowed platform categories 122. In other words, the normalizing may include removing from the $F_c$ list of allowed platform categories 122 any platform categories that also are listed in the $F_c$ list of blocked platform categories 126. When included in the combining 605, the normalizing may be performed subsequent to the creating 610, the creating 625, the creating 640, and/or the creating 655. Additionally or alternatively, the normalizing may be performed on the active aggregated filter ruleset, or in some examples, subsequent to repeating 670.

That said, in some examples, the normalizing is not necessary because of the sequence in which platform access requests are processed through the active aggregated filter ruleset in methods 500. Namely, methods 500 may include determining whether the requested platform is in the $F_A$ list of blocked platforms prior to determining whether the requested platform is in the $F_A$ list of allowed platforms, which resolves any duplicates or conflicts between the blocked and allowed lists.

The combining 605 additionally or alternatively may include deduping, or de-duplicating, the aggregated filter ruleset. More specifically, the deduping comprises removing any redundant instances from any given list of the aggregated filter ruleset. As an illustrative example, the deduping may include identifying any platforms that are listed more than once in the $F_c$ list of allowed platforms 114 and removing each redundant instance of the platform from the $F_c$ list of allowed platforms 114.

The combining 605 further may include maintaining original versions of the filter rulesets 106 that are combined. More specifically, while the combining 605 is discussed herein as adding platforms to and removing platforms from the list of a particular filter ruleset 106, these operations may be performed on a copy of the particular list, such that the original version is unmodified by the combining. This may allow the filter rulesets 106 to be stored in a non-aggregated state and aggregated as needed without modifying the non-aggregated filter rulesets.

As discussed herein, at least one list of filter rulesets 106 combined in the combining 605 may be empty, or not list any platforms or platform categories. For example, a filter ruleset 106 that does not comprise the platform category component 112 additionally or alternatively may be regarded as comprising an empty $F_n$ list of allowed platform categories 122 and an empty $F_n$ list of blocked platform categories 126. In such examples, the combining 605 may be performed in at least substantially the same manner with respect to a combination of a populated, or non-empty, list with a populated list or with respect to a combination of two empty lists as discussed herein for populated, or non-empty, lists.

With continued reference to FIG. 5, in some examples, methods 600 comprise repeating 670 the combining 605 N−2 times to produce the active aggregated filter ruleset, where N is the number of filter rulesets comprised in the plurality of, or stack of, filter rulesets. More specifically, the repeating 670 the combining 605 is performed for examples in which the plurality of filter rulesets 106 includes more than two filter rulesets 106. The repeating 670 the combining 605 comprises combining 605 the aggregated filter ruleset 130 produced in a preceding combining 605 step with the next lowest priority filter ruleset 106. For example, when the plurality of filter rulesets 106 comprises three filter rulesets 106, the combining 605 comprises combining the two lowest priority filter rulesets 106 to produce the aggregated filter ruleset 130, and the repeating 670 the combining 605 comprises combining the aggregated filter ruleset 130 with the third lowest priority filter ruleset ($F_3$). In each repeating 670 the combining 605, the aggregated filter ruleset 130 produced in the preceding combining 605 step is treated as the first lowest priority filter ruleset 106 and the next lowest priority filter ruleset 106 is treated as the second lowest priority filter ruleset 106.

For examples in which the plurality of filter rulesets 106 only comprises two filter rulesets 106, the combining 605 comprises producing the active aggregated filter ruleset 132. In other words, in such examples, the aggregated filter ruleset 130 produced in the combining 605 is the active aggregated filter ruleset 132. For examples in which the plurality of filter rulesets 106 comprises more than two filter rulesets, the active aggregated filter ruleset 132 is produced by repeating 670 the combining 605 N−2 times. The repeating 670 may include repeating any suitable combination of steps of the combining 605 as will be understood from the discussion herein.

Methods 500 and 600 are illustrated as collections of blocks in logical flow graphs, which represent sequences of operations that may be implemented in hardware, software, or a combination thereof. In the context of software, the blocks represent computer-executable instructions stored on one or more computer-readable storage media that, when executed by a processing unit or one or more processors, perform the recited operations. Generally, computer executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the methods. In some embodiments, one or more blocks of the method may be omitted entirely. Moreover, methods 500 and 600 may be combined in whole or in part.

The various methods and systems described herein may be implemented in the context of computer-executable instructions or software that are stored in computer-readable storage and executed by the processing unit or processors of one or more computers or other devices such as those illustrated in the figures. Generally, program components or elements (e.g., access filter 102, combination operator 104, etc.) include routines, programs, objects, components, data structures, etc., and define operating logic for performing particular tasks or implement particular abstract data types. As used herein, the term "component or element" when used in connection with software or firmware functionality may refer to code or computer program instructions that are integrated to varying degrees with the code or computer program instructions of other such "components or elements." The distinct nature of the different components or elements described and depicted herein is used for explanatory purposes and should not be used to limit the scope of this disclosure.

The architectures, systems, and individual elements described herein may include many other logical, programmatic, and physical components, of which those shown in the accompanying figures are merely examples that are related to the discussion herein.

Illustrative, non-exclusive examples of inventive subject matter according to the present disclosure are described in the following enumerated paragraphs:

A. A computing device implemented method for filtering internet access requests, the method comprising:
receiving a platform access request to access a requested platform;
aggregating a plurality of filter rulesets in a hierarchical, priority-ordered combination to produce an active aggregated filter ruleset ($F_A$), wherein each filter ruleset ($F_n$) of the plurality of filter rulesets is assigned a respective priority and comprises a respective $F_n$ list of allowed platforms and a respective $F_n$ list of blocked platforms, and wherein the active aggregated filter ruleset comprises a $F_A$ list of allowed platforms and a $F_A$ list of blocked platforms that are created by the hierarchical, priority-ordered combination of the $F_n$ lists of allowed platforms and the $F_n$ lists of blocked platforms of the plurality of filter rulesets;
processing the platform access request through the active aggregated filter ruleset, the processing comprising:
determining if the requested platform is in the $F_A$ list of blocked platforms and blocking the platform access request if the requested platform is in the $F_A$ list of blocked platforms; and
determining if the requested platform is in the $F_A$ list of allowed platforms and allowing the platform access request if the requested platform is in the $F_A$ list of allowed platforms.

A1. The method of paragraph A, wherein the determining if the requested platform is in the $F_A$ list of allowed platforms is performed if the determining if the requested platform is in the $F_A$ list of blocked platforms comprises determining that the requested platform is not in the $F_A$ list of blocked platforms.

A2. The method of any of paragraphs A-A1, wherein the plurality of filter rulesets comprises N filter rulesets, wherein the aggregating comprises:
combining a first lowest priority filter ruleset ($F_1$) of the plurality of filter rulesets with a second lowest priority filter ruleset ($F_2$) of the plurality of filter rulesets to produce an aggregated filter ruleset ($F_c$) having an $F_c$ list of allowed platforms and an $F_c$ list of blocked platforms, wherein the combining comprises:
removing any blocked platforms of the $F_1$ list of blocked platforms from the $F_1$ list of allowed platforms and adding all allowed platforms of the $F_2$ list of allowed platforms to the $F_1$ list of allowed platforms to create the $F_c$ list of allowed platforms;
removing any allowed platforms of the $F_2$ list of allowed platforms from the $F_1$ list of blocked platforms and adding the $F_2$ list of blocked platforms to the $F_1$ list of blocked platforms to create the $F_c$ list of blocked platforms; and
repeating the combining N−2 times to produce the active aggregated filter ruleset, wherein the aggregated filter ruleset produced in each combining step is treated as the first lowest priority filter ruleset in a subsequent combining with a next lowest priority filter ruleset if the plurality of filter rulesets comprises the next lowest priority filter ruleset.

A3. The method of paragraph A2, wherein when the plurality of filter rulesets comprises two filter rulesets, the aggregated filter set is the active aggregated filter set, and the aggregating does not comprise the repeating the combining.

A4. The method of any of paragraphs A-A3, further comprising determining if the requested platform is in neither of the $F_A$ list of blocked platforms nor the $F_A$ list of allowed platforms and blocking the platform access request when the requested platform is in neither of the $F_A$ list of blocked platforms nor the $F_A$ list of allowed platforms.

A5. The method of any of paragraphs A-A4, wherein each filter ruleset of the plurality of filter rulesets comprises a respective $F_n$ list of allowed platform categories and a respective $F_n$ list of blocked platform categories, and wherein the active aggregated filter ruleset comprises an $F_A$ list of allowed platform categories and an $F_A$ list of blocked platform categories that are created by the hierarchical, priority-ordered combination of the $F_n$ lists of allowed platform categories and the $F_n$ lists of blocked platform categories of the plurality of filter rulesets.

A6. The method of any of paragraphs A-A5, further comprising obtaining a platform category of the requested platform.

A7. The method of any of paragraphs A5-A6, wherein the processing further comprises determining if the requested platform is in neither of the $F_A$ list of blocked platforms nor the $F_A$ list of allowed platforms and if the requested platform is in neither of the $F_A$ list of blocked platforms nor the $F_A$ list of allowed platforms, the processing further comprises:

determining if a/the platform category of the requested platform is in the $F_A$ list of blocked platform categories, and blocking the platform request if the platform category is in the $F_A$ list of blocked platform categories; and determining if the platform category is in the $F_A$ list of allowed platform categories, and allowing the platform request if the platform category is in the $F_A$ list of allowed platform categories.

A8. The method of paragraph A7, wherein the $F_n$ list of allowed platforms and the $F_n$ list of blocked platforms of each filter ruleset of the plurality of filter rulesets are empty such that the $F_A$ list of blocked platforms and the $F_A$ list of allowed platforms are empty.

A9. The method of any of paragraphs A7-A8, wherein the determining if the platform category of the requested platform is in the $F_A$ list of allowed platform categories is performed if the determining if the platform category is in the $F_A$ list of blocked platform categories comprises determining that the platform category is not in the $F_A$ list of blocked platform categories.

A10. The method of any of paragraphs A7-A9, wherein the processing further comprises determining if the platform category is in neither of the $F_A$ list of blocked platform categories nor the $F_A$ list of allowed platform categories and blocking the platform access request when the platform category is in neither of the $F_A$ list of blocked platform categories nor the $F_A$ list of allowed platform categories.

A11. The method of any of paragraphs A7-A10, wherein the combining further comprises:

removing any blocked platform categories of the $F_1$ list of blocked platform categories from the $F_1$ list of allowed platform categories and adding all allowed platform categories of the $F_2$ list of allowed platform categories to the $F_1$ list of allowed platform categories to create an $F_c$ list of allowed platform categories of the aggregated filter ruleset; and removing any allowed platform categories of the $F_2$ list of allowed platform categories from the $F_1$ list of blocked platform categories and adding all blocked platform categories of the $F_2$ list of blocked platform categories to the $F_1$ list of blocked platform categories to create an $F_c$ list of blocked platform categories of the aggregated filter ruleset.

A12. The method of any of paragraphs A-A11, wherein a/the obtaining comprises querying a platform categorization engine for the platform category of the requested platform.

A13. The method of paragraph A12, wherein platform categorization engine is housed on a third party server.

A14. The method of any of paragraphs A12-A13, wherein the obtaining further comprises receiving the platform category of the requested platform from the platform categorization engine.

A15. The method of paragraphs A12-A14, wherein the obtaining comprises receiving a notification from the categorization engine that the platform category of the requested platform is unknown, and wherein the processing comprises blocking the platform access request responsive to each of receipt from the category database that the platform category of the requested platform is unknown and determining if the platform category is in neither of the $F_A$ list of blocked platforms nor the $F_A$ list of allowed platforms.

A16. The method of any of paragraphs A-A15, wherein the receiving comprises receiving the platform access request from a user device.

A17. The method of any of paragraphs A-A16, further comprising identifying the requested platform, wherein the identifying comprises querying a platform database for an identity of the requested platform of the platform access request.

A18. The method of any of paragraphs A-A17, further comprising selecting an appropriate stack of filter rulesets assigned to a/the user device from among a plurality of stacks of filter rulesets, wherein the appropriate filter ruleset stack comprises the plurality of filter rulesets.

A19. The method of any of paragraphs A-A18, further comprising managing the plurality of filter rulesets.

A20. The method of paragraph A19, wherein the managing comprises modifying the plurality of filter rulesets, wherein the modifying comprises one or more of:

adding at least one new filter ruleset to the plurality of filter rulesets; and removing at least one filter ruleset from the plurality of filter rulesets.

A21. The method of paragraph A20, wherein the managing comprises receiving the at least one new filter ruleset from a third party.

A22. The method of any of paragraphs A19-A21, wherein the managing comprises altering a selected filter ruleset of the plurality of filter rulesets, wherein the altering comprises at least one of:

adding at least one allowed platform to the $F_n$ list of allowed platforms of the selected filter ruleset;

removing at least one allowed platform to the $F_n$ list of allowed platforms of the selected filter ruleset;

adding at least one allowed platform category to a/the $F_n$ list of allowed platform categories of the selected filter ruleset; and removing at least one allowed platform category to a/the $F_n$ list of allowed platform categories of the selected filter ruleset.

A23. The method of paragraph A22, wherein the altering comprises altering two or more selected filter rulesets of the plurality of filter rulesets.

A24. The method of any of paragraphs A19-A23, wherein the managing comprises creating a new filter ruleset and adding the new filter ruleset to the plurality of filter rulesets.

A25. The method of paragraph A24, wherein the creating comprises compiling the $F_n$ list of allowed platforms and the $F_n$ list of blocked platforms for the new filter ruleset.

A26. The method of any of paragraphs A19-A25, wherein the managing comprises assigning the respective priority to each filter ruleset of the plurality of filter rulesets.

A27. The method of paragraph A26, wherein the assigning is based on an order in which each filter ruleset is added to the plurality of filter rulesets.

A28. The method of any of paragraphs A19-A27, wherein the managing comprises storing the plurality of filter rulesets in a non-aggregated state, wherein the storing is performed prior to the processing.

A29. The method of any of paragraphs A-A28, wherein at least one of the $F_n$ list of allowed platforms, the $F_n$ list of blocked platforms, a/the $F_n$ list of blocked platform categories, and a/the $F_n$ list of allowed platform categories of at least one filter ruleset of the plurality of rulesets is empty.

A30. The method of any of paragraphs A-A29, further comprising repeating the method of any of paragraphs A-A29 respective to a new platform access request.

A31. The method of any of paragraphs A-A30, wherein the requested platform comprises at least one of internet-accessing application software, an online application, a website, and a service.

A32. The method of any of paragraphs A-A31, wherein a/the platform category of the requested platform comprises one or more of a browsing platform, a search platform, video sharing platform, a video streaming platform, an entertainment platform, a gaming platform, a social media platform, a communication platform, a blog platform, a content-sharing platform, a discussion platform, an audio media platform, a video calling platform, a messaging platform, an email platform, an informational platform, a business platform, a sports platform, an educational platform, a news platform, and/or a computational knowledge platform.

B. A computing device implemented method of aggregating a plurality of filter rulesets having N filter rulesets to produce an active aggregated filter ruleset ($F_A$) for filtering platform access requests, wherein each filter ruleset ($F_n$) of the plurality of filtered rulesets is assigned a respective priority and comprises an $F_n$ list of allowed platforms and an $F_n$ list of blocked platforms, wherein the method comprises:

combining a first lowest priority filter ruleset ($F_1$) of the plurality of filter rulesets with a second lowest priority filter ruleset ($F_2$) of the plurality of filter rulesets to produce an aggregated filter ruleset ($F_c$) having an $F_c$ list of allowed platforms and an $F_n$ list of blocked platforms, wherein the combining comprises:

removing any blocked platforms of the $F_1$ list of blocked platforms from the $F_1$ list of allowed platforms and adding all allowed platforms of the $F_2$ list of allowed platforms to the $F_1$ list of allowed platforms to create the $F_c$ list of allowed platforms;

removing any allowed platforms of the $F_2$ list of allowed platforms from the $F_1$ list of blocked platforms and adding all blocked platforms of the $F_2$ list of blocked platforms to the $F_1$ list of blocked platforms to create the $F_c$ list of blocked platforms; and repeating the combining N−2 times to produce the active aggregated filter ruleset, wherein the aggregated filter ruleset produced in each combining step is treated as the first lowest priority filter ruleset in a subsequent combining with a next lowest priority filter ruleset of the plurality of filter rulesets when the plurality of filter rulesets comprises the next lowest priority filter ruleset.

B1. The method of paragraph B, wherein each filter ruleset of the plurality of filter rulesets further comprises a respective $F_n$ list of blocked platform categories and a respective $F_n$ list of allowed platform categories wherein the combining further comprises:

removing any blocked platform categories of the $F_1$ list of blocked platform categories from the $F_1$ list of allowed platform categories and adding all allowed platform categories of the $F_2$ list of allowed platform categories to the $F_1$ list of allowed platform categories to create an $F_n$ list of allowed platform categories of the aggregated filter ruleset; and removing any allowed platform categories of the $F_2$ list of allowed platform categories from the $F_1$ list of blocked platform categories and adding the $F_2$ list of blocked platform categories to the $F_1$ list of blocked platform categories to create an $F_c$ list of blocked platform categories of the aggregated filter ruleset.

B2. The method of any of paragraphs B-B1, wherein at least one of the $F_n$ list of allowed platforms, the $F_n$ list of blocked platforms, a/the $F_n$ list of blocked platform categories, and a/the $F_n$ list of allowed platform categories of at least one filter ruleset of the plurality of rulesets is empty.

B3. The method of any of paragraphs B-B2, further comprising removing any duplicates from at least one of the $F_c$ list of allowed platforms, the $F_c$ list of blocked platforms, a/the $F_c$ list of blocked platform categories, and a/the $F_c$ list of allowed platform categories.

C. Non-transitory computer-readable storage media comprising instructions that, when executed by a computing device, cause the computing device to perform the method of any of paragraphs A-B3.

C1. A computing device, comprising the non-transitory computer-readable storage media of paragraph C; and a processing unit configured to execute the instructions.

D. A computing device, comprising:

a processing unit;

a memory; and an internet access filtering system stored on the memory, wherein the internet access filtering system comprises non-transitory computer-readable instructions that, when executed by the processing unit, cause the computing device to perform the methods of any of paragraphs A-B3.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

As used herein, storage, or memory, devices and media having computer-executable instructions, as well as computing device implemented methods, and other methods according to the present disclosure are considered to be within the scope of subject matter deemed patentable in accordance with the national laws of the country in which this patent application is pending, such as (but not limited to) Section 101 of Title 35 of the United States Code.

The invention claimed is:

1. A computing device implemented method for filtering internet access requests, the method comprising:
   receiving a request to access a requested platform;
   aggregating a plurality of filter rulesets in a hierarchical, priority-ordered combination to produce an active aggregated filter ruleset, wherein each filter ruleset of the plurality of filter rulesets is assigned a respective priority and comprises a respective list of allowed platforms, a respective list of blocked platforms, a respective list of allowed platform categories, and a respective list of blocked platform categories; and wherein the active aggregated filter ruleset comprises a list of allowed platforms, a list of blocked platforms, a list of allowed platform categories, and a list of blocked platform categories that are created by the hierarchical, priority-ordered combination of the lists of allowed platforms, the lists of blocked platforms, the lists of allowed platform categories, and lists of blocked platform categories of the plurality of filter rulesets;
   each platform defining a unique digital destination that is accessed from a user device and which requires internet access; each platform category defining a type of content that is accessed through a platform, wherein a platform category comprises at least two platforms;
   processing the request through the active aggregated filter ruleset, the processing comprising:
      determining if the requested platform is in the list of blocked platforms;
      blocking the request in response to determining that the requested platform is in the list of blocked platforms;
      determining if the requested platform is in the list of allowed platforms in response to determining that the requested platform is not in the list of blocked platforms;
      allowing the request in response to determining that the requested platform is in the list of allowed platforms;
      determining if a category for the requested platform is in the list of blocked platform categories in response to determining that the requested platform is not in the list of allowed platforms;
      blocking the request in response to determining the category for the requested platform is in the list of blocked platform categories;
      determining if the category for the requested platform is in a list of allowed platform categories in response to determining if the category for the requested platform is not in the list of blocked platform categories;
      allowing the request in response to determining the category for the requested platform is in a list of allowed platform categories; and
      blocking the request in response to determining the category for the requested platform is not in a list of allowed platform categories.

2. The method of claim 1, wherein the plurality of filter rulesets comprises N filter rulesets, wherein the aggregating comprises:
   combining a first lowest priority filter ruleset (F1) of the plurality of filter rulesets with a second lowest priority filter ruleset (F2) of the plurality of filter rulesets to produce an aggregated filter ruleset (Fe) having an Fe list of allowed platforms and an Fe list of blocked platforms, wherein the combining comprises:
      removing any blocked platforms of the F1 list of blocked platforms from the F1 list of allowed platforms and adding all allowed platforms of the F2 list of allowed platforms to the F1 list of allowed platforms to create the Fe list of allowed platforms;
      removing any allowed platforms of the F2 list of allowed platforms from the F1 list of blocked platforms and adding all blocked platforms of the F2 list of blocked platforms to the F1 list of blocked platforms to create the Fe list of blocked platforms.

3. The method of claim 1, wherein the plurality of filter rulesets comprises N filter rulesets, wherein the aggregating comprises:
   combining a first lowest priority filter ruleset (F1) of the plurality of filter rulesets with a second lowest priority filter ruleset (F2) of the plurality of filter rulesets to produce an aggregated filter ruleset (Fe) having an Fe list of allowed platforms, an Fe list of blocked platforms, an Fe list of allowed platform categories, and an Fe list of blocked platform categories, wherein the combining comprises:
      removing any blocked platforms of the F1 list of blocked platforms from the F1 list of allowed platforms and adding all allowed platforms of the F2 list of allowed platforms to the F1 list of allowed platforms to create the Fe list of allowed platforms;
      removing any allowed platforms of the F2 list of allowed platforms from the F1 list of blocked platforms and adding all blocked platforms of the F2 list of blocked platforms to the F1 list of blocked platforms to create the Fe list of blocked platforms;
      removing any blocked platform categories of the F1 list of blocked platform categories from the F1 list of allowed platform categories and adding all allowed platform categories of the F2 list of allowed platform categories to the F1 list of allowed platform categories to create the Fe list of allowed platform categories; and
      removing any allowed platform categories of the F2 list of allowed platform categories from the F1 list of blocked platform categories and adding the all blocked platform categories of the F2 list of blocked platform categories to the F1 list of blocked platform categories to create an Fe list of blocked platform categories.

4. The method of claim 1, further comprising obtaining the platform category of the requested platform, wherein the obtaining comprises querying a platform categorization engine for the platform category of the requested platform.

5. The method of claim 1, further comprising identifying the requested platform, wherein the identifying is performed prior to the processing, and wherein the identifying comprises querying a platform database for an identity of the requested platform.

6. The method of claim 1, wherein the receiving comprises receiving the platform access request from a user device, wherein the method further comprises selecting an appropriate stack of filter rulesets that is assigned to the user device from among a plurality of stacks of filter rulesets, wherein the appropriate stack of filter rulesets comprises the plurality of filter rulesets.

7. The method of claim 1, further comprising managing the plurality of filter rulesets, wherein the managing comprises assigning the respective priority to each filter ruleset of the plurality of filter rulesets.

8. The method of claim 1, further comprising managing the plurality of filter rulesets, wherein the managing comprises storing the plurality of filter rulesets in a non-aggregated state, wherein the storing is performed prior to the processing.

9. The method of claim 1, further comprising receiving a new platform access request and repeating the aggregating and the processing respective to the new platform access request.

10. A non-transitory computer-readable storage media comprising instructions that, when executed by a computing device, cause the computing device to perform a method comprising:
- receiving a request to access a requested platform;
- aggregating a plurality of filter rulesets in a hierarchical, priority-ordered combination to produce an active aggregated filter ruleset, wherein each filter ruleset of the plurality of filter rulesets is assigned a respective priority and comprises a respective list of allowed platforms, a respective list of blocked platforms, a respective list of allowed platform categories, and a respective list of blocked platform categories; and wherein the active aggregated filter ruleset comprises a list of allowed platforms, a list of blocked platforms, a list of allowed platform categories, and a list of blocked platform categories that are created by the hierarchical, priority-ordered combination of the lists of allowed platforms, the lists of blocked platforms, the lists of allowed platform categories, and lists of blocked platform categories of the plurality of filter rulesets;
- each platform defining a unique digital destination that is accessed from a user device and which requires internet access; each platform category defining a type of content that is accessed through a platform, wherein a platform category comprises at least two platforms;
- processing the request through the active aggregated filter ruleset, the processing comprising:
  - determining if the requested platform is in the list of blocked platforms;
  - blocking the request in response to determining that the requested platform is in the list of blocked platforms;
  - determining if the requested platform is in the list of allowed platforms in response to determining that the requested platform is not in the list of blocked platforms;
  - allowing the request in response to determining that the requested platform is in the list of allowed platforms;
  - determining if a category for the requested platform is in the list of blocked platform categories in response to determining that the requested platform is not in the list of allowed platforms;
  - blocking the request in response to determining the category for the requested platform is in the list of blocked platform categories;
  - determining if the category for the requested platform is in a list of allowed platform categories in response to determining if the category for the requested platform is not in the list of blocked platform categories;
  - allowing the request in response to determining the category for the requested platform is in a list of allowed platform categories; and
  - blocking the request in response to determining the category for the requested platform is not in a list of allowed platform categories.

11. A computing device, comprising a non-transitory computer-readable storage media; and a processing unit configured to execute instructions stored on the non-transitory computer-readable media, the instructions comprising:
- receiving a request to access a requested platform;
- aggregating a plurality of filter rulesets in a hierarchical, priority-ordered combination to produce an active aggregated filter ruleset, wherein each filter ruleset of the plurality of filter rulesets is assigned a respective priority and comprises a respective list of allowed platforms, a respective list of blocked platforms, a respective list of allowed platform categories, and a respective list of blocked platform categories; and wherein the active aggregated filter ruleset comprises a list of allowed platforms, a list of blocked platforms, a list of allowed platform categories, and a list of blocked platform categories that are created by the hierarchical, priority-ordered combination of the lists of allowed platforms, the lists of blocked platforms, the lists of allowed platform categories, and lists of blocked platform categories of the plurality of filter rulesets;
- each platform defining a unique digital destination that is accessed from a user device and which requires internet access; each platform category defining a type of content that is accessed through a platform, wherein a platform category comprises at least two platforms;
- processing the request through the active aggregated filter ruleset, the processing comprising:
  - determining if the requested platform is in the list of blocked platforms;
  - blocking the request in response to determining that the requested platform is in the list of blocked platforms;
  - determining if the requested platform is in the list of allowed platforms in response to determining that the requested platform is not in the list of blocked platforms;
  - allowing the request in response to determining that the requested platform is in the list of allowed platforms;
  - determining if a category for the requested platform is in the list of blocked platform categories in response to determining that the requested platform is not in the list of allowed platforms;
  - blocking the request in response to determining the category for the requested platform is in the list of blocked platform categories;
  - determining if the category for the requested platform is in a list of allowed platform categories in response to determining if the category for the requested platform is not in the list of blocked platform categories;
  - allowing the request in response to determining the category for the requested platform is in a list of allowed platform categories; and
  - blocking the request in response to determining the category for the requested platform is not in a list of allowed platform categories.

12. The method of claim 1, wherein the aggregating further comprises:
- combining a first lowest priority filter ruleset (F1) of the plurality of filter rulesets with a second lowest priority filter ruleset (F2) of the plurality of filter rulesets to produce an aggregated filter ruleset (Fe) having an Fe list of allowed platforms and an Fe list of blocked platforms, wherein the combining comprises:

removing any blocked platforms of the F1 list of blocked platforms from the F1 list of allowed platforms and adding all allowed platforms of the F2 list of allowed platforms to the F1 list of allowed platforms to create the Fe list of allowed platforms;

removing any allowed platforms of the F2 list of allowed platforms from the F1 list of blocked platforms and adding all blocked platforms of the F2 list of blocked platforms to the F1 list of blocked platforms to create the Fe list of blocked platforms; and repeating the combining for each subsequent filter ruleset in ascending order of priority to produce the active aggregated filter ruleset.

13. The method of claim 12, wherein each filter ruleset of the plurality of filter rulesets further comprises:

a respective Fn list of blocked platform categories and a respective Fn list of allowed platform categories, and wherein the combining further comprises:

removing any blocked platform categories of the F1 list of blocked platform categories from the F1 list of allowed platform categories and adding all allowed platform categories of the F2 list of allowed platform categories to the F1 list of allowed platform categories to create an Fe list of allowed platform categories; and removing any allowed platform categories of the F2 list of allowed platform categories from the F1 list of blocked platform categories and adding all blocked platform categories of the F2 list of blocked platform categories to the F1 list of blocked platform categories to create an Fe list of blocked platform categories.

* * * * *